US007890705B2

(12) United States Patent
Furusho

(10) Patent No.: US 7,890,705 B2
(45) Date of Patent: Feb. 15, 2011

(54) SHARED-MEMORY MULTIPROCESSOR SYSTEM AND INFORMATION PROCESSING METHOD

(75) Inventor: Shinji Furusho, Kangawa (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 443 days.

(21) Appl. No.: 12/063,798

(22) PCT Filed: Aug. 9, 2006

(86) PCT No.: PCT/JP2006/315738

§ 371 (c)(1),
(2), (4) Date: Feb. 14, 2008

(87) PCT Pub. No.: WO2007/020849

PCT Pub. Date: Feb. 22, 2007

(65) Prior Publication Data

US 2009/0106299 A1 Apr. 23, 2009

(30) Foreign Application Priority Data

Aug. 15, 2005 (JP) .............................. 2005-235129

(51) Int. Cl.
*G06F 12/00* (2006.01)
*G06F 7/00* (2006.01)
(52) U.S. Cl. ...................................... 711/147; 707/752
(58) Field of Classification Search ................. 707/752; 711/147, 154, 153; 709/213; 719/318; 712/16, 712/220
See application file for complete search history.

(56) References Cited

U.S. PATENT DOCUMENTS

| 5,963,746 A * | 10/1999 | Barker et al. ................... 712/20 |
| 6,131,113 A * | 10/2000 | Ellsworth et al. ........... 709/213 |
| 6,427,148 B1 * | 7/2002 | Cossock ...................... 707/700 |
| 6,886,082 B1 * | 4/2005 | Furusho ...................... 711/154 |
| 7,801,903 B2 * | 9/2010 | Furusho ...................... 707/752 |
| 2001/0018733 A1 * | 8/2001 | Fujii et al. ..................... 712/16 |
| 2002/0032691 A1 * | 3/2002 | Rabii et al. ................. 707/200 |
| 2007/0174843 A1 * | 7/2007 | Furusho ...................... 719/318 |

FOREIGN PATENT DOCUMENTS

| JP | 09190337 A | 7/1997 |
| WO | 00/10103 | 2/2000 |
| WO | 2005-041066 A1 | 5/2005 |

OTHER PUBLICATIONS

International Search Report issued in corresponding application No. PCT/JP2006/315738, completed Oct. 31, 2006 and mailed Nov. 14, 2006.

\* cited by examiner

*Primary Examiner*—Hung T Vy
(74) *Attorney, Agent, or Firm*—Griffin & Szipl, P.C.

(57) ABSTRACT

Large-scale table format data on a common memory is sorted in parallel by a plurality of processors. A record to be processed is divided and assigned at first to the processors. Next, each processor counts the number of local appearances of item value numbers related to the record to be processed. Next, the number of local appearances of the item value numbers counted at the processors is converted into the global accumulation of item value numbers, i.e., the accumulation to be commonly used between the processors. Finally, each processor utilizes the global accumulation as a pointer to change the order of the assigned records.

11 Claims, 28 Drawing Sheets

Fig.2

| RECORD NUMBER | GENDER | AGE | HEIGHT (cm) |
|---|---|---|---|
| 0 | FEMALE | 3 | 78 |
| 1 | MALE | 1 | 82 |
| 2 | FEMALE | 2 | 69 |
| 3 | FEMALE | 1 | 82 |
| 4 | MALE | 3 | 91 |
| 5 | FEMALE | 1 | 76 |
| 6 | FEMALE | 1 | 78 |
| 7 | FEMALE | 2 | 84 |
| 8 | MALE | 3 | 87 |
| 9 | FEMALE | 3 | 80 |

Fig.4A

TWO LISTS BEFORE MERGE

| | LIST-1 | | LIST-2 |
|---|---|---|---|
| 0 | 100 | 0 | 80 |
| 1 | 110 | 1 | 90 |
| 2 | 120 | 2 | 100 |
| 3 | 160 | 3 | 120 |
| 4 | 180 | 4 | 180 |
| 5 | 200 | 5 | 190 |
| 6 | 210 | 6 | 201 |
| 7 | 220 | 7 | 230 |
| 8 | 250 | 8 | 250 |
| 9 | 260 | 9 | 290 |
| 10 | 300 | 10 | 300 |
| 11 | 320 | 11 | 310 |
| 12 | 330 | 12 | 320 |
| 13 | 340 | 13 | 370 |
| 14 | 380 | 14 | 400 |
| 15 | 390 | 15 | 420 |
| 16 | 400 | 16 | 430 |
| 17 | 410 | 17 | 460 |
| 18 | 440 | 18 | 470 |
| 19 | 450 | 19 | 480 |
| | | 20 | 500 |
| | | 21 | 550 |
| | | 22 | 555 |

LIST AFTER MERGE

| | LIST-3 |
|---|---|
| 0 | 80 |
| 1 | 90 |
| 2 | 100 |
| 3 | 110 |
| 4 | 120 |
| 5 | 160 |
| 6 | 180 |
| 7 | 190 |
| 8 | 200 |
| 9 | 201 |
| 10 | 210 |
| 11 | 220 |
| 12 | 230 |
| 13 | 250 |
| 14 | 260 |
| 15 | 290 |
| 16 | 300 |
| 17 | 310 |
| 18 | 320 |
| 19 | 330 |
| 20 | 340 |
| 21 | 370 |
| 22 | 380 |
| 23 | 390 |
| 24 | 400 |
| 25 | 410 |
| 26 | 420 |
| 27 | 430 |
| 28 | 440 |
| 29 | 450 |
| 30 | 460 |
| 31 | 470 |
| 32 | 480 |
| 33 | 500 |
| 34 | 550 |
| 35 | 555 |

EXAMPLE OF SIMPLE SECTIONAL DIVISION OF TWO LISTS

| LIST-1 | |
|---|---|
| 0 | 100 |
| 1 | 110 |
| 2 | 120 |
| 3 | 160 |
| 4 | 180 |
| 5 | 200 |
| 6 | 210 |
| 7 | 220 |
| 8 | 250 |
| 9 | 260 |
| 10 | 300 |
| 11 | 320 |
| 12 | 330 |
| 13 | 340 |
| 14 | 380 |
| 15 | 390 |
| 16 | 400 |
| 17 | 410 |
| 18 | 440 |
| 19 | 450 |

401

CPU-0 (0–4), CPU-1 (5–9), CPU-2 (10–14), CPU-3 (15–19)

CPU-0 (0–4), CPU-1 (5–9), CPU-2 (10–14), CPU-3 (15–22)

| LIST-2 | |
|---|---|
| 0 | 80 |
| 1 | 90 |
| 2 | 100 |
| 3 | 120 |
| 4 | 180 |
| 5 | 190 |
| 6 | 201 |
| 7 | 230 |
| 8 | 250 |
| 9 | 290 |
| 10 | 300 |
| 11 | 310 |
| 12 | 320 |
| 13 | 370 |
| 14 | 400 |
| 15 | 420 |
| 16 | 430 |
| 17 | 460 |
| 18 | 470 |
| 19 | 480 |
| 20 | 500 |
| 21 | 550 |
| 22 | 555 |

EXAMPLE 1 OF SECTIONAL DIVISION OF TWO LISTS, CONSIDERING BOUNDARY VALUE

| LIST-1 | |
|---|---|
| 0 | 100 |
| 1 | 110 |
| 2 | 120 |
| 3 | 160 |
| 4 | 180 |
| 5 | 200 |
| 6 | 210 |
| 7 | 220 |
| 8 | 250 |
| 9 | 260 |
| 10 | 300 |
| 11 | 320 |
| 12 | 330 |
| 13 | 340 |
| 14 | 380 |
| 15 | 390 |
| 16 | 400 |
| 17 | 410 |
| 18 | 440 |
| 19 | 450 |

401

CPU-0, CPU-1, CPU-2, CPU-3

CPU-0, CPU-1, CPU-2, CPU-3

| LIST-2 | |
|---|---|
| 0 | 80 |
| 1 | 90 |
| 2 | 100 |
| 3 | 120 |
| 4 | 180 |
| 5 | 190 |
| 6 | 201 |
| 7 | 230 |
| 8 | 250 |
| 9 | 290 |
| 10 | 300 |
| 11 | 310 |
| 12 | 320 |
| 13 | 370 |
| 14 | 400 |
| 15 | 420 |
| 16 | 430 |
| 17 | 460 |
| 18 | 470 |
| 19 | 480 |
| 20 | 500 |
| 21 | 550 |
| 22 | 555 |

EXAMPLE 2 OF SECTIONAL DIVISION OF TWO LISTS, CONSIDERING BOUNDARY VALUE

LIST-1 (401):
| Index | Value |
|---|---|
| 0 | 100 |
| 1 | 110 |
| 2 | 120 |
| 3 | 160 |
| 4 | 180 |
| 5 | 200 |
| 6 | 210 |
| 7 | 220 |
| 8 | 250 |
| 9 | 260 |
| 10 | 300 |
| 11 | 320 |
| 12 | 330 |
| 13 | 340 |
| 14 | 380 |
| 15 | 390 |
| 16 | 400 |
| 17 | 410 |
| 18 | 440 |
| 19 | 450 |

- CPU-0: indices 0–4
- CPU-1: indices 5–9
- CPU-2: indices 10–14
- CPU-3: indices 15–19

LIST-2 (402):
| Index | Value |
|---|---|
| 0 | 80 |
| 1 | 90 |
| 2 | 100 |
| 3 | 120 |
| 4 | 180 |
| 5 | 190 |
| 6 | 201 |
| 7 | 230 |
| 8 | 250 |
| 9 | 290 |
| 10 | 300 |
| 11 | 310 |
| 12 | 320 |
| 13 | 370 |
| 14 | 400 |
| 15 | 420 |
| 16 | 430 |
| 17 | 460 |
| 18 | 470 |
| 19 | 480 |
| 20 | 500 |
| 21 | 550 |
| 22 | 555 |

- CPU-0: indices 0–4
- CPU-1: indices 5–9
- CPU-2: indices 10–14
- CPU-3: indices 15–22

Fig.6B

EXAMPLE 2 OF SECTIONAL DIVISION OF TWO LISTS, CONSIDERING BOUNDARY VALUE AND THROUGHPUT

LIST-1 (401): same as above.

- CPU-0: indices 0–4
- CPU-1: indices 5–9
- CPU-2: indices 10–14
- CPU-3: indices 15–19

LIST-2 (402): same as above.

- CPU-0: indices 0–4
- CPU-1: indices 5–9
- CPU-2: indices 10–14
- CPU-3: indices 15–22

Fig.7A

COUNT OF THE NUMBER OF ELEMENTS

| | LIST-1 | Count-1 |
|---|---|---|
| 0 | 100 | 2 |
| 1 | 110 | 0 |
| 2 | 120 | 0 |
| 3 | 160 | 0 |
| 4 | 180 | 0 |
| 5 | 200 | 1 |

| | LIST-2 | Count-2 |
|---|---|---|
| 0 | 80 | 0 |
| 1 | 90 | 0 |
| 2 | 100 | 0 |
| 3 | 120 | 1 |
| 4 | 180 | 1 |
| 5 | 190 | 0 |

Fig.7B

AGGREGATION OF THE NUMBER OF ELEMENTS

| | LIST-1 | Aggr-1 |
|---|---|---|
| 0 | 100 | 2 |
| 1 | 110 | 2 |
| 2 | 120 | 2 |
| 3 | 160 | 2 |
| 4 | 180 | 2 |
| 5 | 200 | 3 |

| | LIST-2 | Aggr-2 |
|---|---|---|
| 0 | 80 | 0 |
| 1 | 90 | 0 |
| 2 | 100 | 0 |
| 3 | 120 | 1 |
| 4 | 180 | 2 |
| 5 | 190 | 2 |

Fig.7C

RANKING OF ELEMENTS IN SECTION

| | LIST-1 | Aggr-1 |
|---|---|---|
| 0 | 100 | 2 |
| 1 | 110 | 3 |
| 2 | 120 | 4 |
| 3 | 160 | 5 |
| 4 | 180 | 6 |
| 5 | 200 | 8 |

| | LIST-2 | Aggr-2 |
|---|---|---|
| 0 | 80 | 0 |
| 1 | 90 | 1 |
| 2 | 100 | 2 |
| 3 | 120 | 4 |
| 4 | 180 | 6 |
| 5 | 190 | 7 |

Fig.7D

LIST MERGED IN SECTION

| | LIST-3 |
|---|---|
| 0 | 80 |
| 1 | 90 |
| 2 | 100 |
| 3 | 110 |
| 4 | 120 |
| 5 | 160 |
| 6 | 180 |
| 7 | 190 |
| 8 | 200 |

Fig.8A

RANKING OF ELEMENTS ALLOCATED TO CPU-0 IN SECTION

| LIST-1 | Aggr-1 | | LIST-2 | Aggr-2 |
|---|---|---|---|---|
| 0 | 100 | 2 | 0 | 80 | 0 |
| 1 | 110 | 3 | 1 | 90 | 1 |
| 2 | 120 | 4 | 2 | 100 | 2 |
| 3 | 160 | 5 | 3 | 120 | 4 |
| 4 | 180 | 6 | 4 | 180 | 6 |
| 5 | 200 | 8 | 5 | 190 | 7 |

THE NUMBER OF UNIQUE VALUES=9

Fig.8B

RANKING OF ELEMENTS ALLOCATED TO CPU-1 IN SECTION

| LIST-1 | Aggr-1 | | LIST-2 | Aggr-2 |
|---|---|---|---|---|
| 0 | 210 | 1 | 0 | 201 | 0 |
| 1 | 220 | 2 | 1 | 230 | 3 |
| 2 | 250 | 4 | 2 | 250 | 4 |
| 3 | 260 | 5 | 3 | 290 | 6 |
| 4 | 300 | 7 | 4 | 300 | 7 |

THE NUMBER OF UNIQUE VALUES=8

Fig.8C

RANKING OF ELEMENTS ALLOCATED TO CPU-2 IN SECTION

| LIST-1 | Aggr-1 | | LIST-2 | Aggr-2 |
|---|---|---|---|---|
| 0 | 320 | 1 | 0 | 310 | 0 |
| 1 | 330 | 2 | 1 | 320 | 1 |
| 2 | 340 | 3 | 2 | 370 | 4 |
| 3 | 380 | 5 | 3 | 400 | 7 |
| 4 | 390 | 6 | | | |
| 5 | 400 | 7 | | | |
| 6 | 410 | 8 | | | |

THE NUMBER OF UNIQUE VALUES=9

Fig.8D

RANKING OF ELEMENTS ALLOCATED TO CPU-3 IN SECTION

| LIST-1 | Aggr-1 | | LIST-2 | Aggr-2 |
|---|---|---|---|---|
| 0 | 440 | 2 | 0 | 420 | 0 |
| 1 | 450 | 3 | 1 | 430 | 1 |
| | | | 2 | 460 | 4 |
| | | | 3 | 470 | 5 |
| | | | 4 | 480 | 6 |
| | | | 5 | 500 | 7 |
| | | | 6 | 550 | 8 |
| | | | 7 | 555 | 9 |

THE NUMBER OF UNIQUE VALUES=10

Fig.9A

RANKING OF ELEMENTS ALLOCATED TO CPU-0 AFTER MERGE

| LIST-1 | Aggr-1 | LIST-2 | Aggr-2 |
|---|---|---|---|
| 0 | 100 | 2 | 0 | 80 | 0 |
| 1 | 110 | 3 | 1 | 90 | 1 |
| 2 | 120 | 4 | 2 | 100 | 2 |
| 3 | 160 | 5 | 3 | 120 | 4 |
| 4 | 180 | 6 | 4 | 180 | 6 |
| 5 | 200 | 8 | 5 | 190 | 7 |

Fig.9B

RANKING OF ELEMENTS ALLOCATED TO CPU-1 AFTER MERGE

| LIST-1 | Aggr-1 | LIST-2 | Aggr-2 |
|---|---|---|---|
| 0 | 210 | 10 | 0 | 201 | 9 |
| 1 | 220 | 11 | 1 | 230 | 12 |
| 2 | 250 | 13 | 2 | 250 | 13 |
| 3 | 260 | 14 | 3 | 290 | 15 |
| 4 | 300 | 16 | 4 | 300 | 16 |

Fig.9C

RANKING OF ELEMENTS ALLOCATED TO CPU-2 AFTER MERGE

| LIST-1 | Aggr-1 | LIST-2 | Aggr-2 |
|---|---|---|---|
| 0 | 320 | 18 | 0 | 310 | 17 |
| 1 | 330 | 19 | 1 | 320 | 18 |
| 2 | 340 | 20 | 2 | 370 | 21 |
| 3 | 380 | 22 | 3 | 400 | 24 |
| 4 | 390 | 23 | | | |
| 5 | 400 | 24 | | | |
| 6 | 410 | 25 | | | |

Fig.9D

RANKING OF ELEMENTS ALLOCATED TO CPU-3 AFTER MERGE

| LIST-1 | Aggr-1 | LIST-2 | Aggr-2 |
|---|---|---|---|
| 0 | 440 | 28 | 0 | 420 | 26 |
| 1 | 450 | 29 | 1 | 430 | 27 |
| | | | 2 | 460 | 30 |
| | | | 3 | 470 | 31 |
| | | | 4 | 480 | 32 |
| | | | 5 | 500 | 33 |
| | | | 6 | 550 | 34 |
| | | | 7 | 555 | 35 |

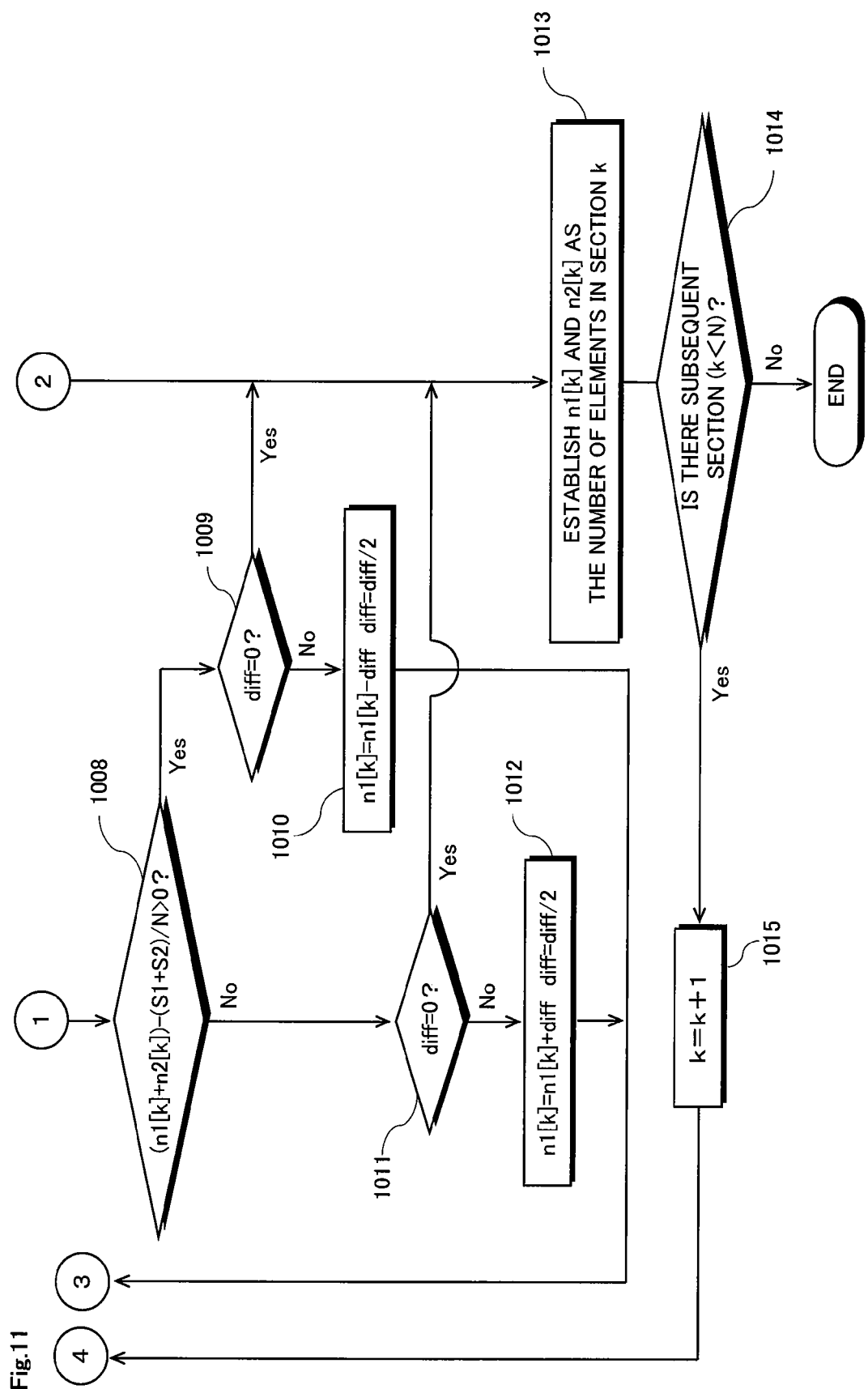

Fig.12A LIST PREPARATION

| | LIST-1 | | LIST-2 |
|---|---|---|---|
| 0 | 100 | 0 | 80 |
| 1 | 110 | 1 | 90 |
| 2 | 120 | 2 | 100 |
| 3 | 160 | 3 | 120 |
| 4 | 180 | 4 | 180 |
| 5 | 200 | 5 | 190 |
| 6 | 210 | 6 | 201 |
| 7 | 220 | 7 | 230 |
| 8 | 250 | 8 | 250 |
| 9 | 260 | 9 | 290 |
| 10 | 300 | 10 | 300 |
| 11 | 320 | 11 | 310 |
| 12 | 330 | 12 | 320 |
| 13 | 340 | 13 | 370 |
| 14 | 380 | 14 | 400 |
| 15 | 390 | 15 | 420 |
| 16 | 400 | 16 | 430 |
| 17 | 410 | 17 | 460 |
| 18 | 440 | 18 | 470 |
| 19 | 450 | 19 | 480 |
| | | 20 | 500 |
| | | 21 | 550 |
| | | 22 | 555 |

Fig.12B COUNT ARRAY INITIALIZATION

| | Count-1 | LIST-1 | | Count-2 | LIST-2 |
|---|---|---|---|---|---|
| 0 | 0 | 100 | 0 | 0 | 80 |
| 1 | 0 | 110 | 1 | 0 | 90 |
| 2 | 0 | 120 | 2 | 0 | 100 |
| 3 | 0 | 160 | 3 | 0 | 120 |
| 4 | 0 | 180 | 4 | 0 | 180 |
| 5 | 0 | 200 | 5 | 0 | 190 |
| 6 | 0 | 210 | 6 | 0 | 201 |
| 7 | 0 | 220 | 7 | 0 | 230 |
| 8 | 0 | 250 | 8 | 0 | 250 |
| 9 | 0 | 260 | 9 | 0 | 290 |
| 10 | 0 | 300 | 10 | 0 | 300 |
| 11 | 0 | 320 | 11 | 0 | 310 |
| 12 | 0 | 330 | 12 | 0 | 320 |
| 13 | 0 | 340 | 13 | 0 | 370 |
| 14 | 0 | 380 | 14 | 0 | 400 |
| 15 | 0 | 390 | 15 | 0 | 420 |
| 16 | 0 | 400 | 16 | 0 | 430 |
| 17 | 0 | 410 | 17 | 0 | 460 |
| 18 | 0 | 440 | 18 | 0 | 470 |
| 19 | 0 | 450 | 19 | 0 | 480 |
| | | | 20 | 0 | 500 |
| | | | 21 | 0 | 550 |
| | | | 22 | 0 | 555 |

Fig.13B SECTIONAL DIVISION OF LIST

| Count-1 | LIST-1 | | LIST-2 | Count-2 |
|---|---|---|---|---|
| 0 | 100 | | 80 | 0 |
| 0 | 110 | | 90 | 0 |
| 0 | 120 | | 100 | 0 |
| 0 | 160 | | 120 | 0 |
| 0 | 180 | | 180 | 0 |
| 0 | 200 | | 190 | 0 |
| 0 | 210 | | 201 | 0 |
| 0 | 220 | | 230 | 0 |
| 0 | 250 | | 250 | 0 |
| 0 | 260 | | 290 | 0 |
| 0 | 300 | | 300 | 0 |
| 0 | 320 | | 310 | 0 |
| 0 | 330 | | 320 | 0 |
| 0 | 340 | | 370 | 0 |
| 0 | 380 | | 400 | 0 |
| 0 | 390 | | 420 | 0 |
| 0 | 400 | | 430 | 0 |
| 0 | 410 | | 460 | 0 |
| 0 | 440 | | 470 | 0 |
| 0 | 450 | | 480 | 0 |
|   |   | | 500 | 0 |
|   |   | | 550 | 0 |
|   |   | | 555 | 0 |

LIST-1 CPU assignment: CPU-0 (0–4), CPU-1 (5–9), CPU-2 (10–14), CPU-3 (15–19)
LIST-2 CPU assignment: CPU-0 (0–5), CPU-1 (6–9), CPU-2 (10–13), CPU-3 (14–22)

Fig.13A PROCESSING RANGE LIMITATION

| Count-1 | LIST-1 | | LIST-2 | Count-2 |
|---|---|---|---|---|
| 0 | 100 | | 80 | 0 |
| 0 | 110 | | 90 | 0 |
| 0 | 120 | | 100 | 0 |
| 0 | 160 | | 120 | 0 |
| 0 | 180 | | 180 | 0 |
| 0 | 200 | | 190 | 0 |
| 0 | 210 | | 201 | 0 |
| 0 | 220 | | 230 | 0 |
| 0 | 250 | | 250 | 0 |
| 0 | 260 | | 290 | 0 |
| 0 | 300 | | 300 | 0 |
| 0 | 320 | | 310 | 0 |
| 0 | 330 | | 320 | 0 |
| 0 | 340 | | 370 | 0 |
| 0 | 380 | | 400 | 0 |
| 0 | 390 | | 420 | 0 |
| 0 | 400 | | 430 | 0 |
| 0 | 410 | | 460 | 0 |
| 0 | 440 | | 470 | 0 |
| 0 | 450 | | 480 | 0 |
|   |   | | 500 | 0 |
|   |   | | 550 | 0 |
|   |   | | 555 | 0 |

Fig.14A

NUMBER OF
UNIQUE VALUES
0->1

| Count-1 | LIST-1 |
|---|---|
| 0 | 0 | (100) |
| 1 | 0 | 110 |
| 2 | 0 | 120 |
| 3 | 0 | 160 |
| 4 | 0 | 180 |

| LIST-2 | Count-2 |
|---|---|
| 2 | (100) | 0 |
| 3 | 120 | 0 |
| 4 | 180 | 0 |
| 5 | 190 | 0 |

Fig.14B

NUMBER OF
UNIQUE VALUES
1->2

| Count-1 | LIST-1 |
|---|---|
| 0 | 0 | 100 |
| 1 | 0 | (110) |
| 2 | 0 | 120 |
| 3 | 0 | 160 |
| 4 | 0 | 180 |

| LIST-2 | Count-2 |
|---|---|
| 2 | 100 | 0 |
| 3 | (120) | 0->1 |
| 4 | 180 | 0 |
| 5 | 190 | 0 |

Fig.14C

NUMBER OF
UNIQUE VALUES
2->3

| Count-1 | LIST-1 |
|---|---|
| 0 | 0 | 100 |
| 1 | 0 | 110 |
| 2 | 0 | (120) |
| 3 | 0 | 160 |
| 4 | 0 | 180 |

| LIST-2 | Count-2 |
|---|---|
| 2 | 100 | 0 |
| 3 | (120) | 1 |
| 4 | 180 | 0 |
| 5 | 190 | 0 |

Fig.14D

NUMBER OF
UNIQUE VALUES
3->4

| Count-1 | LIST-1 |
|---|---|
| 0 | 0 | 100 |
| 1 | 0 | 110 |
| 2 | 0 | 120 |
| 3 | 0 | (160) |
| 4 | 0 | 180 |

| LIST-2 | Count-2 |
|---|---|
| 2 | 100 | 0 |
| 3 | 120 | 1 |
| 4 | (180) | 0->1 |
| 5 | 190 | 0 |

Fig.14E

NUMBER OF
UNIQUE VALUES
4->5

| Count-1 | LIST-1 |
|---|---|
| 0 | 0 | 100 |
| 1 | 0 | 110 |
| 2 | 0 | 120 |
| 3 | 0 | 160 |
| 4 | 0 | (180) |

| LIST-2 | Count-2 |
|---|---|
| 2 | 100 | 0 |
| 3 | 120 | 1 |
| 4 | (180) | 1 |
| 5 | 190 | 0 |

Fig.14F

NUMBER OF
UNIQUE VALUES
5->6

| Count-1 | LIST-1 |
|---|---|
| 0 | 0 | 100 |
| 1 | 0 | 110 |
| 2 | 0 | 120 |
| 3 | 0 | 160 |
| 4 | 0 | 180 |

| LIST-2 | Count-2 |
|---|---|
| 2 | 100 | 0 |
| 3 | 120 | 1 |
| 4 | 180 | 1 |
| 5 | (190) | 0 |

Fig.15A

| | NUMBER OF UNIQUE VALUES | Count-1 | LIST-1 | | LIST-2 | Count-2 |
|---|---|---|---|---|---|---|
| | 2 | | | 0 | 80 | 0 |
| | | | | 1 | 90 | 0 |
| | | | | ... | | |

Fig.15B

CPU-0

| | NUMBER OF UNIQUE VALUES | | Count-1 | LIST-1 | | LIST-2 | Count-2 |
|---|---|---|---|---|---|---|---|
| | 6 | | | ... | | ... | |
| | | 0 | 0 | 100 | 2 | 100 | 0 |
| | | 1 | 0 | 110 | 3 | 120 | 1 |
| | | 2 | 0 | 120 | 4 | 180 | 1 |
| | | 3 | 0 | 160 | 5 | 190 | 0 |
| | | 4 | 0 | 180 | | ... | |
| | | | ... | | | | |

Fig.15C

CPU-1

| | NUMBER OF UNIQUE VALUES | | Count-1 | LIST-1 | | LIST-2 | Count-2 |
|---|---|---|---|---|---|---|---|
| | 8 | | ... | | | ... | |
| | | 5 | 0 | 200 | 6 | 201 | 1 |
| | | 6 | 1 | 210 | 7 | 230 | 2 |
| | | 7 | 0 | 220 | 8 | 250 | 0 |
| | | 8 | 1 | 250 | 9 | 290 | 1 |
| | | 9 | 0 | 260 | | ... | |
| | | | ... | | | | |

Fig.15D

CPU-2

| | NUMBER OF UNIQUE VALUES | | Count-1 | LIST-1 | | LIST-2 | Count-2 |
|---|---|---|---|---|---|---|---|
| | 7 | | ... | | | ... | |
| | | 10 | 0 | 300 | 10 | 300 | 0 |
| | | 11 | 1 | 320 | 11 | 310 | 0 |
| | | 12 | 0 | 330 | 12 | 320 | 0 |
| | | 13 | 0 | 340 | 13 | 370 | 2 |
| | | 14 | 1 | 380 | | ... | |
| | | | ... | | | | |

Fig.15E

CPU-3

| | NUMBER OF UNIQUE VALUES | | Count-1 | LIST-1 | | LIST-2 | Count-2 |
|---|---|---|---|---|---|---|---|
| | 7 | | ... | | | ... | |
| | | 15 | 0 | 390 | 14 | 400 | 1 |
| | | 16 | 0 | 400 | 15 | 420 | 1 |
| | | 17 | 0 | 410 | 16 | 430 | 0 |
| | | 18 | 2 | 440 | | ... | |
| | | 19 | 0 | 450 | | | |

Fig.15F

| | NUMBER OF UNIQUE VALUES | Count-1 | LIST-1 | | LIST-2 | Count-2 |
|---|---|---|---|---|---|---|
| | 6 | | | | ... | |
| | | | | 17 | 460 | 0 |
| | | | | 18 | 470 | 0 |
| | | | | 19 | 480 | 0 |
| | | | | 20 | 500 | 0 |
| | | | | 21 | 550 | 0 |
| | | | | 22 | 555 | 0 |

Fig.16A

NUMBER OF UNIQUE VALUES: 2

| Count-1 | LIST-1 |
|---|---|
| ... | ... |

| | LIST-2 | Count-2 |
|---|---|---|
| 0 | 80 | 0 |
| 1 | 90 | 0 |
| ... | ... | ... |

⇒

| | LIST-2 | Aggr-2 |
|---|---|---|
| 0 | 80 | 0 |
| 1 | 90 | 0 |
| ... | ... | ... |

Fig.16B

CPU-0 NUMBER OF UNIQUE VALUES: 6

| | Count-1 | LIST-1 |
|---|---|---|
| 0 | 0 | 100 |
| 1 | 0 | 110 |
| 2 | 0 | 120 |
| 3 | 0 | 160 |
| 4 | 0 | 180 |
| ... | ... | ... |

⇒

| | Aggr-1 | LIST-1 |
|---|---|---|
| 0 | 0 | 100 |
| 1 | 0 | 110 |
| 2 | 0 | 120 |
| 3 | 0 | 160 |
| 4 | 0 | 180 |
| ... | ... | ... |

| | LIST-2 | Count-2 |
|---|---|---|
| 2 | 100 | 0 |
| 3 | 120 | 1 |
| 4 | 180 | 1 |
| 5 | 190 | 0 |
| ... | ... | ... |

⇒

| | LIST-2 | Aggr-2 |
|---|---|---|
| 2 | 100 | 0 |
| 3 | 120 | 1 |
| 4 | 180 | 2 |
| 5 | 190 | 2 |
| ... | ... | ... |

Fig.16C

CPU-1 NUMBER OF UNIQUE VALUES: 8

| | Count-1 | LIST-1 |
|---|---|---|
| 5 | 0 | 200 |
| 6 | 1 | 210 |
| 7 | 0 | 220 |
| 8 | 1 | 250 |
| 9 | 0 | 260 |
| ... | ... | ... |

⇒

| | Aggr-1 | LIST-1 |
|---|---|---|
| 5 | 0 | 200 |
| 6 | 1 | 210 |
| 7 | 1 | 220 |
| 8 | 2 | 250 |
| 9 | 2 | 260 |
| ... | ... | ... |

| | LIST-2 | Count-2 |
|---|---|---|
| 6 | 201 | 1 |
| 7 | 230 | 2 |
| 8 | 250 | 0 |
| 9 | 290 | 1 |
| ... | ... | ... |

⇒

| | LIST-2 | Aggr-2 |
|---|---|---|
| 6 | 201 | 1 |
| 7 | 230 | 3 |
| 8 | 250 | 3 |
| 9 | 290 | 4 |
| ... | ... | ... |

Fig.17A

CPU-2
NUMBER OF
UNIQUE VALUES
| 7 |

| Count-1 | LIST-1 | | Aggr-1 | LIST-1 | | LIST-2 Count-2 | | LIST-2 Aggr-2 |
|---|---|---|---|---|---|---|---|---|
| 10 | 0 | | 10 | 0 | 300 | 10 | 0 | 10 | 0 | 300 | 10 | 0 |
| 11 | 1 | 300 | 11 | 1 | 320 | 11 | 0 | 310 | 11 | 0 |
| 12 | 0 | 320 | 12 | 1 | 330 | 12 | 0 | 320 | 12 | 0 |
| 13 | 0 | 330 | 13 | 1 | 340 | 13 | 2 | 370 | 13 | 2 |
| 14 | 1 | 340 | 14 | 2 | 380 | | | |
| | | 380 | | | | | | |

Fig.17B

CPU-3
NUMBER OF
UNIQUE VALUES
| 7 |

| Count-1 | LIST-1 | | Aggr-1 | LIST-1 | | LIST-2 Count-2 | | LIST-2 Aggr-2 |
|---|---|---|---|---|---|---|---|---|
| 15 | 0 | 390 | 15 | 0 | 390 | 14 | 1 | 400 | 14 | 1 |
| 16 | 0 | 400 | 16 | 0 | 400 | 15 | 1 | 420 | 15 | 2 |
| 17 | 0 | 410 | 17 | 0 | 410 | 16 | 0 | 430 | 16 | 2 |
| 18 | 2 | 440 | 18 | 2 | 440 | | | |
| 19 | 0 | 450 | 19 | 2 | 450 | | | |

Fig.17C

NUMBER OF
UNIQUE VALUES
| 6 |

| Count-1 | LIST-1 | LIST-2 Count-2 | | LIST-2 Aggr-2 |
|---|---|---|---|---|
| | | 17 | 0 | 460 | 17 | 0 |
| | | 18 | 0 | 470 | 18 | 0 |
| | | 19 | 0 | 480 | 19 | 0 |
| | | 20 | 0 | 500 | 20 | 0 |
| | | 21 | 0 | 550 | 21 | 0 |
| | | 22 | 0 | 555 | 22 | 0 |

Fig.18A

NUMBER OF
UNIQUE VALUES  2

| LIST-2 | Aggr-2 |
|---|---|
| 80 | 0 |
| 90 | 0 |
| ... | ... |

→

| | LIST-2 | Aggr-2 |
|---|---|---|
| 0 | 80 | 0 |
| 1 | 90 | 1 |
| ... | ... | ... |

Fig.18B

CPU-0
NUMBER OF
UNIQUE VALUES  6

| Aggr-1 | LIST-1 |
|---|---|
| 0 | 100 |
| 0 | 110 |
| 0 | 120 |
| 0 | 160 |
| 0 | 180 |
| ... | ... |

→

| | Aggr-1 | LIST-1 |
|---|---|---|
| 0 | 2 | 100 |
| 1 | 3 | 110 |
| 2 | 4 | 120 |
| 3 | 5 | 160 |
| 4 | 6 | 180 |

| LIST-2 | Aggr-2 |
|---|---|
| 100 | 0 |
| 120 | 1 |
| 180 | 2 |
| 190 | 2 |
| ... | ... |

→

| | LIST-2 | Aggr-2 |
|---|---|---|
| 2 | 100 | 2 |
| 3 | 120 | 4 |
| 4 | 180 | 6 |
| 5 | 190 | 7 |

Fig.18C

CPU-1
NUMBER OF
UNIQUE VALUES  8

| Aggr-1 | LIST-1 |
|---|---|
| 0 | 200 |
| 1 | 210 |
| 1 | 220 |
| 2 | 250 |
| 2 | 260 |
| ... | ... |

→

| | Aggr-1 | LIST-1 |
|---|---|---|
| 5 | 8 | 200 |
| 6 | 10 | 210 |
| 7 | 11 | 220 |
| 8 | 13 | 250 |
| 9 | 14 | 260 |

| LIST-2 | Aggr-2 |
|---|---|
| 201 | 1 |
| 230 | 3 |
| 250 | 3 |
| 290 | 4 |
| ... | ... |

→

| | LIST-2 | Aggr-2 |
|---|---|---|
| 6 | 201 | 9 |
| 7 | 230 | 12 |
| 8 | 250 | 13 |
| 9 | 290 | 15 |

Fig.19A

CPU-2 NUMBER OF UNIQUE VALUES: 7

| Aggr-1 | LIST-1 | | Aggr-1 | LIST-1 | | LIST-2 Aggr-2 | | | LIST-2 Aggr-2 |
|---|---|---|---|---|---|---|---|---|---|
| 10 | 0 | 300 | 10 | 16 | 300 | 10 | 300 | 0 | 10 | 300 | 16 |
| 11 | 1 | 320 | 11 | 18 | 320 | 11 | 310 | 0 | 11 | 310 | 17 |
| 12 | 1 | 330 | 12 | 19 | 330 | 12 | 320 | 0 | 12 | 320 | 18 |
| 13 | 1 | 340 | 13 | 20 | 340 | 13 | 370 | 2 | 13 | 370 | 21 |
| 14 | 2 | 380 | 14 | 22 | 380 | | | | | | |

Fig.19B

CPU-3 NUMBER OF UNIQUE VALUES: 7

| Aggr-1 | LIST-1 | | Aggr-1 | LIST-1 | | LIST-2 Aggr-2 | | | LIST-2 Aggr-2 |
|---|---|---|---|---|---|---|---|---|---|
| 15 | 0 | 390 | 15 | 23 | 390 | 14 | 400 | 1 | 14 | 400 | 24 |
| 16 | 0 | 400 | 16 | 24 | 400 | 15 | 420 | 2 | 15 | 420 | 26 |
| 17 | 0 | 410 | 17 | 25 | 410 | 16 | 430 | 2 | 16 | 430 | 27 |
| 18 | 2 | 440 | 18 | 28 | 440 | | | | | | |
| 19 | 2 | 450 | 19 | 29 | 450 | | | | | | |

Fig.19C

NUMBER OF UNIQUE VALUES: 6

| LIST-2 | Aggr-2 | | LIST-2 | Aggr-2 |
|---|---|---|---|---|
| 17 | 460 | 0 | 17 | 460 | 30 |
| 18 | 470 | 0 | 18 | 470 | 31 |
| 19 | 480 | 0 | 19 | 480 | 32 |
| 20 | 500 | 0 | 20 | 500 | 33 |
| 21 | 550 | 0 | 21 | 550 | 34 |
| 22 | 555 | 0 | 22 | 555 | 35 |

Fig.20

| | Aggr-1 | LIST-1 | LIST-2 | Aggr-2 |
|---|---|---|---|---|
| 0 | | | 80 | 0 |
| 1 | | | 90 | 1 |
| 2 | 2 | 100 | 100 | 2 |
| 3 | 3 | 110 | | |
| 4 | 4 | 120 | 120 | 4 |
| 5 | 5 | 160 | | |
| 6 | 6 | 180 | 180 | 6 |
| 7 | | | 190 | 7 |
| 8 | 8 | 200 | | |
| 9 | | | 201 | 9 |
| 10 | 10 | 210 | | |
| 11 | 11 | 220 | | |
| 12 | | | 230 | 12 |
| 13 | 13 | 250 | 250 | 13 |
| 14 | 14 | 260 | | |
| 15 | | | 290 | 15 |
| 16 | 16 | 300 | 300 | 16 |
| 17 | | | 310 | 17 |
| 18 | 18 | 320 | 320 | 18 |
| 19 | 19 | 330 | | |
| 20 | 20 | 340 | | |
| 21 | | | 370 | 21 |
| 22 | 22 | 380 | | |
| 23 | 23 | 390 | | |
| 24 | 24 | 400 | 400 | 24 |
| 25 | 25 | 410 | | |
| 26 | | | 420 | 26 |
| 27 | | | 430 | 27 |
| 28 | 28 | 440 | | |
| 29 | 29 | 450 | | |
| 30 | | | 460 | 30 |
| 31 | | | 470 | 31 |
| 32 | | | 480 | 32 |
| 33 | | | 500 | 33 |
| 34 | | | 550 | 34 |
| 35 | | | 555 | 35 |

Fig.21

FIRST STEP

| | Aggr-1 | LIST-1 | LIST-2 | Aggr-2 | | LIST-3 |
|---|---|---|---|---|---|---|
| 0 | | | 80 | 0 | 0 | – |
| 1 | | | 90 | 1 | 1 | – |
| 2 | 2 | 100 | 100 | 2 | 2 | ->100 |
| 3 | 3 | 110 | | | 3 | ->110 |
| 4 | 4 | 120 | 120 | 4 | 4 | ->120 |
| 5 | 5 | 160 | | | 5 | ->160 |
| 6 | 6 | 180 | 180 | 6 | 6 | ->180 |
| 7 | | | 190 | 7 | 7 | – |
| 8 | 8 | 200 | | | 8 | ->200 |
| 9 | | | 201 | 9 | 9 | – |
| 10 | 10 | 210 | | | 10 | ->210 |
| 11 | 11 | 220 | | | 11 | ->220 |
| 12 | | | 230 | 12 | 12 | – |
| 13 | 13 | 250 | 250 | 13 | 13 | ->250 |
| 14 | 14 | 260 | | | 14 | ->260 |
| 15 | | | 290 | 15 | 15 | – |
| 16 | 16 | 300 | 300 | 16 | 16 | ->300 |
| 17 | | | 310 | 17 | 17 | – |
| 18 | 18 | 320 | 320 | 18 | 18 | ->320 |
| 19 | 19 | 330 | | | 19 | ->330 |
| 20 | 20 | 340 | | | 20 | ->340 |
| 21 | | | 370 | 21 | 21 | – |
| 22 | 22 | 380 | | | 22 | ->380 |
| 23 | 23 | 390 | | | 23 | ->390 |
| 24 | 24 | 400 | 400 | 24 | 24 | ->400 |
| 25 | 25 | 410 | | | 25 | ->410 |
| 26 | | | 420 | 26 | 26 | – |
| 27 | | | 430 | 27 | 27 | – |
| 28 | 28 | 440 | | | 28 | ->440 |
| 29 | 29 | 450 | | | 29 | ->450 |
| 30 | | | 460 | 30 | 30 | – |
| 31 | | | 470 | 31 | 31 | – |
| 32 | | | 480 | 32 | 32 | – |
| 33 | | | 500 | 33 | 33 | – |
| 34 | | | 550 | 34 | 34 | – |
| 35 | | | 555 | 35 | 35 | – |

Fig.22

SECOND STEP

| | Aggr-1 | LIST-1 | LIST-2 | Aggr-2 | | LIST-3 |
|---|---|---|---|---|---|---|
| 0 | | | 80 | 0 | 0 | ->80 |
| 1 | | | 90 | 1 | 1 | ->90 |
| 2 | 2 | 100 | 100 | 2 | 2 | 100->100 |
| 3 | 3 | 110 | | | 3 | 110 |
| 4 | 4 | 120 | 120 | 4 | 4 | 120->120 |
| 5 | 5 | 160 | | | 5 | 160 |
| 6 | 6 | 180 | 180 | 6 | 6 | 180->180 |
| 7 | | | 190 | 7 | 7 | ->190 |
| 8 | 8 | 200 | | | 8 | 200 |
| 9 | | | 201 | 9 | 9 | ->201 |
| 10 | 10 | 210 | | | 10 | 210 |
| 11 | 11 | 220 | | | 11 | 220 |
| 12 | | | 230 | 12 | 12 | ->230 |
| 13 | 13 | 250 | 250 | 13 | 13 | 250->250 |
| 14 | 14 | 260 | | | 14 | 260 |
| 15 | | | 290 | 15 | 15 | ->290 |
| 16 | 16 | 300 | 300 | 16 | 16 | 300->300 |
| 17 | | | 310 | 17 | 17 | ->310 |
| 18 | 18 | 320 | 320 | 18 | 18 | 320->320 |
| 19 | 19 | 330 | | | 19 | 330 |
| 20 | 20 | 340 | | | 20 | 340 |
| 21 | | | 370 | 21 | 21 | ->370 |
| 22 | 22 | 380 | | | 22 | 380 |
| 23 | 23 | 390 | | | 23 | 390 |
| 24 | 24 | 400 | 400 | 24 | 24 | 400->400 |
| 25 | 25 | 410 | | | 25 | 410 |
| 26 | | | 420 | 26 | 26 | ->420 |
| 27 | | | 430 | 27 | 27 | ->430 |
| 28 | 28 | 440 | | | 28 | 440 |
| 29 | 29 | 450 | | | 29 | 450 |
| 30 | | | 460 | 30 | 30 | ->460 |
| 31 | | | 470 | 31 | 31 | ->470 |
| 32 | | | 480 | 32 | 32 | ->480 |
| 33 | | | 500 | 33 | 33 | ->500 |
| 34 | | | 550 | 34 | 34 | ->550 |
| 35 | | | 555 | 35 | 35 | ->555 |

Fig.23

| | FINAL RESULT LIST-3 |
|---|---|
| 0 | 80 |
| 1 | 90 |
| 2 | 100 |
| 3 | 110 |
| 4 | 120 |
| 5 | 160 |
| 6 | 180 |
| 7 | 190 |
| 8 | 200 |
| 9 | 201 |
| 10 | 210 |
| 11 | 220 |
| 12 | 230 |
| 13 | 250 |
| 14 | 260 |
| 15 | 290 |
| 16 | 300 |
| 17 | 310 |
| 18 | 320 |
| 19 | 330 |
| 20 | 340 |
| 21 | 370 |
| 22 | 380 |
| 23 | 390 |
| 24 | 400 |
| 25 | 410 |
| 26 | 420 |
| 27 | 430 |
| 28 | 440 |
| 29 | 450 |
| 30 | 460 |
| 31 | 470 |
| 32 | 480 |
| 33 | 500 |
| 34 | 550 |
| 35 | 555 |

Fig.24A

TABLE A

| | Sex | Age |
|---|---|---|
| 0 | Woman | 18 |
| 1 | Man | 21 |
| 2 | Woman | 24 |
| 3 | Woman | 16 |
| 4 | Man | 28 |
| 5 | Woman | 20 |
| 6 | Woman | 16 |
| 7 | Man | 33 |
| 8 | Man | 24 |
| 9 | Woman | 18 |

NARROW DOWN TO WOMAN ⇒

| | Sex | Age |
|---|---|---|
| 0 | Woman | 18 |
| 2 | Woman | 24 |
| 3 | Woman | 16 |
| 5 | Woman | 20 |
| 6 | Woman | 16 |
| 9 | Woman | 18 |

MATCHED ⇒

| | Sex | Age |
|---|---|---|
| 0 | Woman | 18 |
| 5 | Woman | 20 |
| 9 | Woman | 18 |

UNMATCHED ⇒

| | Sex | Age |
|---|---|---|
| 2 | Woman | 24 |
| 3 | Woman | 16 |
| 6 | Woman | 16 |

Fig.24B

TABLE B

| | Sex | Age |
|---|---|---|
| 0 | Man | 20 |
| 1 | Woman | 21 |
| 2 | Woman | 21 |
| 3 | Woman | 19 |
| 4 | Woman | 18 |
| 5 | Man | 18 |
| 6 | Woman | 20 |
| 7 | Man | 22 |

NARROW DOWN TO WOMAN ⇒

| | Sex | Age |
|---|---|---|
| 1 | Woman | 21 |
| 2 | Woman | 21 |
| 3 | Woman | 19 |
| 4 | Woman | 18 |
| 6 | Woman | 20 |

MATCHED ⇒

| | Sex | Age |
|---|---|---|
| 4 | Woman | 18 |
| 6 | Woman | 20 |

UNMATCHED ⇒

| | Sex | Age |
|---|---|---|
| 1 | Woman | 21 |
| 2 | Woman | 21 |
| 3 | Woman | 19 |

Fig.26A

TABLE A

| OrdSet' | | VNo | Age VL |
|---|---|---|---|
| 0 | 0 | 1 | 0 16 |
| 1 | 2 | 3 | 1 18 |
| 2 | 3 | 4 | 2 20 |
| 3 | 5 | 0 | 3 21 |
| 4 | 6 | 5 | 4 24 |
| 5 | 9 | 2 | 5 28 |
| | | 0 | 6 33 |
| | | 6 | ASCENDING ORDER |
| | | 4 | |
| | | 1 | |

Valid Flag
0: 0
1: 0->1
2: 0
3: 0
4: 0
5: 0
6: 0

COMPLETED →

AFTER COMPLETION
Valid Flag
0: 1
1: 1
2: 1
3: 0
4: 1
5: 0
6: 0

VALID VALUE VL'
0: 16
1: 18
2: 20
3: 24
ASCENDING ORDER

Fig.26B

TABLE B

| OrdSet' | | VNo | Age VL |
|---|---|---|---|
| 0 | 1 | 2 | 0 18 |
| 1 | 2 | 3 | 1 19 |
| 2 | 3 | 1 | 2 20 |
| 3 | 4 | 0 | 3 21 |
| 4 | 6 | 0 | 4 22 |
| | | 0 | ASCENDING ORDER |
| | | 2 | |
| | | 4 | |

Valid Flag
0: 0
1: 0
2: 0->1
3: 0
4: 0

COMPLETED →

AFTER COMPLETION
Valid Flag
0: 1
1: 1
2: 1
3: 1
4: 0

VALID VALUE VL'
0: 18
1: 19
2: 20
3: 21
ASCENDING ORDER

Fig.27A

TABLE A

FROM TABLE B ↓

Age

| | VNo | | VL | | VL' | | Exist Flag |
|---|---|---|---|---|---|---|---|
| 0 | 1 | 0 | 16 | 0 | 18 | 0 | 0 |
| 1 | 3 | 1 | 18 | 1 | 19 | 1 | 0→1 |
| 2 | 4 | 2 | 20 | 2 | 20 | 2 | 0→1 |
| 3 | 0 | 3 | 21 | 3 | 21 | 3 | 0→1 |
| 4 | 5 | 4 | 24 | | ASCENDING ORDER | 4 | 0 |
| 5 | 2 | 5 | 28 | | | 5 | 0 |
| 6 | 0 | 6 | 33 | | | 6 | 0 |
| 7 | 6 | | ASCENDING ORDER | | | | |
| 8 | 4 | | | | | | |
| 9 | 1 | | | | | | |

Fig.27B

TABLE B

FROM TABLE A ↓

Age

| | VNo | | VL | | VL' | | Exist Flag |
|---|---|---|---|---|---|---|---|
| 0 | 2 | 0 | 18 | 0 | 16 | 0 | 0→1 |
| 1 | 3 | 1 | 19 | 1 | 18 | 1 | 0 |
| 2 | 3 | 2 | 20 | 2 | 20 | 2 | 0→1 |
| 3 | 1 | 3 | 21 | 3 | 24 | 3 | 0 |
| 4 | 0 | 4 | 22 | | ASCENDING ORDER | 4 | 0 |
| 5 | 0 | | ASCENDING ORDER | | | | |
| 6 | 2 | | | | | | |
| 7 | 4 | | | | | | |

SHARED-MEMORY MULTIPROCESSOR SYSTEM AND INFORMATION PROCESSING METHOD

This is a National Phase Application in the United States of International Patent Application No. PCT/JP2006/315738 filed Aug. 9, 2006, which claims priority on Japanese Patent Application No. 2005-235129, filed Aug. 15, 2005. The entire disclosures of the above patent applications are hereby incorporated by reference.

TECHNICAL FIELD

The present invention relates to a method for processing information in a shared-memory multiprocessor system in which a plurality of processors share a memory to perform parallel processing, and particularly relates to an information processing method for processing two sets of large-scale data in the shared memory by use of the plurality of processors.

The present invention also relates to a shared-memory multiprocessor system that performs such information processing method.

The present invention further relates to a program for realizing such information processing method.

The present invention further relates to a memory medium storing such program.

BACKGROUND ART

In this day and age when computers are used in every corner of society and networks such as the Internet are widely used, the storing and processing of large-scale data has become common occurrence.

Conventionally, data structures suitable for high-speed processing of the large-scale data have been proposed. For example, the inventor has proposed a data management mechanism suitable for searching, summarizing and sorting of large-scale data or particularly table data at a high speed (See Patent Document 1). This data management mechanism uses an information block for representing the individual field values of a field included in the table data. In this information block, field values belonging to a field of the table data are represented by field value sequence numbers assigned to the respective field values and an array of the actual field values arranged in the order of field value sequence numbers. An array is provided in which the field value sequence numbers corresponding to the field values of respective records are arranged in the order of the record numbers. The field value of a given record is identified by finding the value corresponding to the field value sequence number of this given record in the array of the field values. Also, a record to be processed in table data is identified by use of an array in which record numbers are arranged in sequence.

The information block is a table in which field values corresponding to field value sequence numbers are stored in the order of field value sequence numbers with respect to each field of the table data, wherein the field value sequence numbers represent the sequencing of field values (i.e., assigning integers to field values) belonging to a given field. The field values may be any type of data such as numerical values (integer, fixed point, floating point, or the like) or character strings. This data management mechanism has an advantage in that a value of any data type can be treated as an integer that is a field value sequence number. Namely, when character-string data are to be sorted according to this data management mechanism, for example, character-string data are not the actual sort objects subjected to sorting, but field value sequence numbers corresponding to the values of character-string data are the actual sort objects that are to be sorted. In so doing, the results of sorting are represented by an array in which record numbers are arranged in sequence.

In order to execute a huge amount of calculation required for the processing of the large-scale data at a high speed, introduction of parallel processing has been attempted. In general the parallel processing architecture is roughly classified into "distributed memory type" and "shared memory type".

In the distributed memory type, each processor has its own local memory, and a system is constructed by connecting them. With this way, a hardware system incorporating several hundreds to several tens of thousands of processors can be designed theoretically. However, the distributed memory type has technical problems such as the complexity distributed data management and the low efficiency in communication between processors. The inventor has proposed a distributed-memory type computer architecture that solves these technical problems and is capable of parallel processing of large-scale table data (See Patent Document 2). The information processing system described in Patent Document 2 is provided with a plurality of memory modules having a memory and a controller and a data transmission path for connecting the memory modules to each other and transmitting a value contained in one of the memory modules to another memory module, in which the memory of each memory module is configured to hold a list of values sequenced in ascending order or descending order without duplication. The controller of each memory module includes means for transmitting a value included in the value list to another memory module and means for receiving a value included in the value list from another memory module. By this arrangement, the controller of each memory module can obtain a global order of the value of its own value list, considering the value in the value lists in other memory modules by comparing the value of its own value list with the value list of another memory module.

On the other hand, the shared-memory type is a way in which a single large memory space is shared by a plurality of processors. In this way, traffic between the processor group and the shared memory makes a bottleneck, and it is considered difficult to construct a system using more than a hundred processors in actuality. However, under these circumstances, personal computers configured as a shared-memory multi-processor system using a plurality of CPU are available in recent years. A standard CPU used in this type of personal computer operates with an internal clock of 5-6 times that of a memory bus and is internally provided with an automatic parallel execution function or a pipeline processing function so that approximately single data can be processed by a single clock (memory bus).

Therefore, processing of large-scale data at a speed higher than that of a single processor system by using the personal computer configured as the shared-memory multiprocessor system is desired.

Patent Document 1: International Publication No. WO00/10103

Patent Document 2: International Publication No. WO2005/041066

DISCLOSURE OF THE INVENTION

Problems to be Solved by the Invention

When large-scale data is to be processed by a plurality of processors, there can be a way of dividing and allocating the data to each processor and a way of dividing and allocating a function to each processor. In an environment in which a table data extending over several million lines is to be processed, for example, application of the same operation to the large-scale data is generally more efficient than application of different operations to the large-scale data at the same time. That is because, if the number of processors is larger than the number of different operations to be applied at the same time, some processors are left unused. Therefore, a multiprocessor system becomes more effective by dividing the large-scale data and applying the same processing to the divided data in parallel. Also, efficiency of the parallel processing is improved by allocating the data so that there is no fluctuation in throughput of the plurality of processors.

Moreover, in a merge process for merging two sets of large-scale data or in a matching process for determining match/mismatch of two sets of large-scale data, the two sets of large-scale data to be compared should be allocated to the plurality of processors. Moreover, data to be actually compared from the two sets of large-scale data should be allocated to the same processor. As above in the shared-memory multiprocessor system, when two sets of large-scale data are combined to be processed, the two sets of large-scale data are preferably allocated to a plurality of processors appropriately.

Then, it is an object of the present invention to provide an information processing method in a shared memory multiprocessor system for efficiently processing the large-scale data in parallel by appropriately allocating the large-scale data to a plurality of processors.

It is another object of the present invention to provide a shared-memory multiprocessor system for performing such information processing method.

It is still another object of the present invention to provide a program for realizing such information processing method.

It is still another object of the present invention to provide a recording medium for storing such program thereon.

Means for Solving the Problems

As mentioned above, the inventor has already proposed a data management mechanism for handling large-scale table data. In this data management mechanism, a field value belonging to a field in the table data is represented by a field value sequence number given to each field value and an array of actual field values arranged in the order of the field value sequence numbers. The field values may be any type of data such as numerical values (integer, fixed point, floating point, or the like) or character strings. They are stored in the array in the order of the field value sequence number or in a predetermined order such as ascending order or descending order of the values, for example. The inventor has demonstrated that operations such as sorting can be executed extremely efficiently by arranging the large-scale data in a predetermined order such as the ascending order or descending order of the values (See Patent Document 1).

The large-scale table data leads to not only the huge number of records but also the huge size of arrays of the field values. Therefore, when the large-scale table data in the data management mechanism is handled by a shared-memory multiprocessor system, there can be a way of dividing the array of field values arranged in the predetermined order and allocating them to a plurality of processors. In this case, after the data arranged in the predetermined order is allocated to the plurality of processors, the parallel processing of the large-scale data is realized by processing the allocated data with the plurality of processors, respectively. The inventor noted a point that the data allocated to the individual processors are objects to be operated as sorting and proposes that when the large-scale data is arranged in a predetermined order such as an ascending order or descending order of the values, the large-scale data is allocated to the plurality of processors with the predetermined order maintained.

Moreover, in an application to merge two sets of large-scale table data, corresponding field values stored in the respective table data are compared in many cases. If the corresponding field values are allocated to separate processors, the values can not be directly compared with each other easily. Thus, by appropriately allocating the two sets of large-scale data to the plurality of processors, the merging of the table data is efficiently realized. The inventor proposes that even if the two sets of large-scale data are to be allocated to a plurality of processors, by allocating the large-scale data to the plurality of processors with the predetermined order maintained, the data should be allocated to the processors such that similar data from separate sets of data or particularly, data having values matched can be allocated to the same processor, and an amount of data to be allocated to each processor is equalized as much as possible.

Principles of the present invention will be put into practice in the following various aspects.

An embodiment according to a first aspect of the present invention is directed to an information processing method for merging a first array and a second array in a predetermined order without duplication in a shared-memory processor system including a memory storing the first array and the second array in which values without duplication are stored in a predetermined order, which is an ascending order or descending order, and a plurality of processors operable to access the memory, the method comprising steps of:

allocating elements in the first array and elements in the second array to the plurality of processors in the predetermined order by dividing the first array into a plurality of sections according to the number of the plurality of processors, defining a plurality of sections in the second array corresponding to the plurality of sections in the first array according to a value of an element at a boundary of the divided section in the first array, and adjusting the boundary of the section so that a difference in a total number of elements in the first array and elements in the second array between the plurality of sections falls within a predetermined tolerance;

sequencing, by each of the plurality of processors, the elements in the first array and the elements in the second array allocated to each processor within the section corresponding to each processor in the predetermined order and counting the number of unique values of the elements included in the section by comparing the element in the first array and the element in the second array allocated to each processor; and sequencing, by each of the plurality of processors, the values stored in the first array and the values stored in the second array in the predetermined order by adding the total number of the unique values of the elements included in the sections preceding the sections allocated to each processor with respect to the predetermined order to a sequence number assigned to the element of the first array and the element of the second array allocated to each processor.

According to this embodiment, the step of allocating elements in the first array and elements in the second array to the plurality of processors in the predetermined order divides the sections of the first array and the second array so that the number of elements allocated to each processor is well-balanced, that is, a difference in the total number of elements falls within a predetermined tolerance. As a result, fluctuation in throughputs of the processors is reduced and efficiency of parallel processing is improved. Since, in the divided section, the elements in the first array and the elements in the second array are arranged in the respective predetermined orders, in the subsequent step, the elements in the section can be sequenced by sequentially comparing these elements in the arrays. This step also counts the number of unique values of the elements included in the section. This step is executed in parallel with regard to the section allocated to the processor by each of the plurality of processors. In the further subsequent step, each processor adds the total number of unique values of the elements included in the section preceding the section allocated to the processor to the sequencing of the element included in the section allocated to the processor. By this arrangement, a series of sequence numbers can be assigned to all the elements in the first array and the second array allocated to the plurality of processors. As a result, the elements in the first array and the elements in the second array to which the series of sequence numbers are assigned can be arranged in the predetermined order without duplication.

In an example of this embodiment, before the element in the first array and the elements in the second array are allocated to the plurality of processors, a range of values present in either one of the first array or the second array, that is, a range of values present in only one of the arrays is precluded from the section to be allocated. In the range of these values, the sequencing of the values of the elements in the section and counting of the number of unique values of the elements need to be considered only for one of the arrays. Therefore, the elements of the array excluding the range of these values are allocated to the plurality of processors.

In an example of this embodiment, the number of unique values of the elements is obtained by counting the occurrence times of non-matching values in comparing the elements in the first array and the elements in the second array. Alternatively, the number of unique values of the elements may be determined on the basis of the maximum value of the sequence numbers assigned to the elements in the section. For example, if the sequence number starts with 0, the number of unique values of the elements may be obtained by (maximum value of the sequence number)−1.

According to an example of the embodiment, the information processing method further includes a step of creating a third array in which the values stored in the first array and the values stored in the second array are merged in the predetermined order without duplication by arranging the values stored in the first array and the values stored in the second array according to the sequence numbers assigned to the values stored in the first array and the values stored in the second array and storing the third array in the memory. Thus, the third array obtained by merging the first array and the second array can be stored in the memory for further processing.

According to an example of the embodiment, the sequence numbers assigned to the elements in the first array and the elements in the second array, which are allocated to the processor in a range of the sections corresponding to the processor, are obtained by calculating a total value of the number of elements in one array sequenced before a specific element in the other array for all the elements in the first array and the second array, and by adding the sequence number of the specific element in the range of the sections for the other array to the calculated total value.

Moreover, the total value of the number of the elements in the one array sequenced before the specific element in the other array is obtained by calculating the number of elements in the one array having the value falling between the specific element of the other array and the element immediately before the specific element as a count value corresponding to the specific element in the other array and by aggregating the count value.

As mentioned above, since the elements in the first array and the elements in the second array are arranged in the predetermined order (for example, in ascending order or descending order of values), when one array (array A, for example) is to be merged to the other array (array B, for example), the number of elements from the array A to be inserted immediately before a specific element in the other array B can be calculated by sequentially comparing the elements in the first array and the second array allocated to each processor from the beginning. By aggregating this count value, the number of elements in the one array A sequenced before the specific element in the other array B can be obtained. This cumulative count value corresponding to the specific element in the other array B represents a rank at which the specific element included in the other array B is to be placed in case of the specific element being present in the one array A, that is, the sequence number to be assigned to that specific element in case of the specific element being present in the one array A. The sequence number of the specific element included in the other array B in the section is determined by adding the sequence number of the specific element in the other order array B to the specific number in the one array A. Thus, the sequence number of the element in the section allocated to each processor can be obtained by counting the number of element numbers to be inserted from the one array to the other array, aggregating the count value, and converting the aggregated total number to the sequence number.

In this embodiment, the conversion from the aggregated total number to the sequence number is achieved by addition of the sequence numbers. Also, as mentioned above, the conversion from the sequence number for a section to a series of sequence numbers for all the sections is also achieved by addition. Therefore, in an example of this embodiment, the conversion from the aggregated total number to the sequence number for the section and the conversion from the sequence number within the section to the series of sequence numbers for all the sections can be executed at the same time.

According to the first aspect of the present invention, the position of the merged element is obtained by a calculation executed in parallel at each processor, and two sets of large-scale data can be efficiently merged at a high speed.

An embodiment according to a second aspect of the present invention is directed to an information processing method of distinguishing a value present in a second array among values contained in a first array, in a shared-memory processor system including a memory storing the first array and the second array storing values in a predetermined order, which is ascending or descending order, without duplication; and a plurality of processors operable to access the memory.

This information processing method comprises steps of:

allocating elements of the first array and elements of the second array to the plurality of the processors in the predetermined order by dividing the first array into a plurality of sections according to the number of the plurality of processors, defining corresponding sections in the second array according to a value of an element at a boundary of the divided section in the first array, and adjusting the boundary of the sections so that a difference in a total number of elements in the first array and elements in the second array between the plurality of sections falls within a predetermined tolerance; and comparing, by each of the plurality of the processors, the element in the first array and the element in the second array allocated to each processor and if it is determined that an element having a value matching that of the element in the first array allocated to each processor within a range of the section corresponding to each processor is present in the second array allocated to each processor, and marking the element having the matching value in the first array.

In the information processing method according to the second aspect of the present invention, when there are two sets of large-scale data, an element in one of the two sets of the large-scale data is marked if a value of the element included in the one set of the large-scale data is included in the other set of the large-scale data. This information processing method divides a first array and a second array into sections in the first step so that the number of elements allocated to each processor is balanced, that is, a difference in the total number of the elements between the sections falls within a predetermined tolerance in a manner similarly to the information processing method according to the first aspect of the present invention. In the next step, a value in the first array is marked if the same value is present in the second array. In dividing the sections, the data having the matching value are allocated to an identical processor, and marking is carried out efficiently.

One example of the embodiment further includes a step of preparing a third array having the same size as the first array in the memory, wherein the step of marking the element having the matching value in the first array includes a step of setting a flag to an element in the third array corresponding to the element having the matching value in the first array. Thus, a flag array indicating presence of a matching value can be created in the memory for future processing.

According to a third aspect of the present invention, an information processing method for classifying records included in one of two set of table data based on whether there is a record in the other of the two set of the table data such that the record from the other set of the table data has the same field value as that of a predetermined field in the record from the one set of the table format data is provided. This embodiment according to the third aspect of the present invention is directed to an information processing method for classifying records included in a first table data into matching records and non-matching records based on whether there is a record in a second table data such that the record in the second table has the same field value as that of the record in the first table, in a shared-memory multiprocessor system including a memory for storing the first table data and the second table data and a plurality of processors operable to access to the memory, wherein the first table data and the second table data are stored in the memory as a record number array containing record numbers of the respective records according to a predetermined record order, a field value sequence number array containing field value sequence numbers corresponding to field values of a predetermined field in the records of the table data according to the record number, and a field value array containing the field values of the table data according to the order of the field value sequence number corresponding to the field value, the information processing method comprising steps of:

allocating elements in the field value array of the first table data and elements of the field value array of the second table data to the plurality of the processors in the predetermined order by dividing the field value array into a plurality of sections according to the number of the plurality of processors, defining corresponding sections in the field value array of the second table data according to a value of an element at a boundary of the divided section in the field value array of the first table data, and adjusting the boundary of the sections so that a difference in a total number of elements in the field value array of the first data and elements in the field value array of the second table data among the plurality of sections falls within a predetermined tolerance; and comparing, by each of the plurality of the processors, the element in the field value array of the first table data and the element in the field value array of the second table data allocated to each processor and if it is determined that an element having a value matching that of the element in the field value array of the first table data allocated to each processor within a range of the section corresponding to each processor is present in the field value table of the second table data allocated to each processor, marking the element having the matching value in the field value array in the first table data, allocating a plurality of portions to the plurality of processors by dividing the record number array of the first table data to the plurality of the portions, the number of the plurality of the portions being equal to the number of the plurality of processors; and reading out, by each of the plurality of the processors, the record number from the allocated portion in the record number array of the first table data, reading out the field value sequence number corresponding to the read out record number from the field value sequence number array of the first table data, determining whether an element in the field value array of the first table data corresponding to the read out field value sequence number has been marked, and if the element has been marked, classifying the read out record number as the matching record, or otherwise classifying the read out record number as the non-matching record.

The information processing method according to this embodiment, similarly to the information processing method of the second embodiment, firstly, division to sections is achieved to balance the number of elements and then, a value in the field value array of the first table data is marked, the value being present in the field value array of the second table data. Thereafter, the record number array is divided and allocated to the plurality of processors. This allows classifying the record numbers to be performed in parallel. That is, each processor reads out the record number from the allocated record number array of the first table data, reads out the field value sequence number from the field value sequence number array using the read out record number, determines whether the value corresponding to the field value sequence number is present in the field value array of the second table data based on marking on the element using the read out field value sequence number, and classifies the read out record number into a matching or non-matching class.

According to an example of this embodiment, subsequent to classifying the records relating to the first table data, the corresponding records relating to the second table can be classified into the classes. According to another example of this embodiment, classifying the records relating to the first table data and classifying the corresponding records relating to the second table format are executed in parallel by classifying the plurality of processors into two groups.

The field value array might include a value which is not to be actually referred to due to operations such as deletion of a record or the like. Then, the information processing method according to an example of this embodiment further includes a step of creating a valid field value array from the field value array, the valid field value array containing only the values to be actually referred to by the record stored in the record number array. This allows a subsequent marking process to be executed more efficiently. Furthermore, the valid field value array could be created in parallel by dividing and allocating the record number array to the plurality of processors.

An embodiment according to a fourth aspect of the present invention is directed to a shared-memory processor system for carrying out the information processing method according to the present invention, the system comprising a memory storing a first array and a second array containing values in a predetermined order, which is ascending or descending order, without duplication, and a plurality of processors operable to access the memory.

Any one of the plurality of processors comprises means to allocate elements in the first array and elements in the second array to the plurality of processors in the predetermined order by dividing the first array into a plurality of sections according to the number of the plurality of processors, defining a plurality of sections in the second array corresponding to the plurality of sections in the first array according to a value of an element at a boundary of the divided section in the first array, and adjusting the boundary of the section so that a difference in a total number of elements in the first array and elements in the second array between the plurality of sections falls within a predetermined tolerance.

Each of the plurality of processors comprises means to sequence the elements in the first array and the elements in the second array allocated to each processor within the section corresponding to each processor in the predetermined order and count the number of unique values of the elements included in the section by comparing the element in the first array and the element in the second array allocated to each processor; and means to sequence the values stored in the first array and the values stored in the second array in the predetermined order by adding the total number of the unique values of the elements included in the sections preceding the sections allocated to each processor with respect to the predetermined order to a sequence number assigned to the element of the first array and the element of the second array allocated to each processor.

An embodiment according to a fifth aspect of the present invention is directed to a shared-memory processor system for carrying out the information processing method according to the present invention, the system comprising a memory storing a first array and a second array containing values in a predetermined order, which is ascending or descending order, without duplication, and a plurality of processors operable to access the memory.

Any one of the plurality of processors comprises means to allocate elements of the first array and elements of the second array to the plurality of the processors in the predetermined order by dividing the first array into a plurality of sections according to the number of the plurality of processors, defining corresponding sections in the second array according to a value of an element at a boundary of the divided section in the first array, and adjusting the boundary of the sections so that a difference in a total number of elements in the first array and elements in the second array among the plurality of sections falls within a predetermined tolerance.

Each of the plurality of processors comprises means to compare the element in the first array and the element in the second array allocated to each processor and if it is determined that an element having a value matching that of the element in the first array allocated to each processor within a range of the section corresponding to each processor is present in the second array allocated to each processor, mark the element having the matching value in the first array.

An embodiment according to a sixth aspect of the present invention is directed to a shared-memory multiprocessor system for carrying out the information processing method according to the present invention, the system comprising a memory storing a first table data and a second table data and a plurality of processors operable to access the memory, wherein the first table data and the second table data are stored in the memory as a record number array containing record numbers of the respective records according to a predetermined record order, a field value sequence number array containing field value sequence numbers corresponding to field values of a predetermined field in the records of the table data according to the record number, and a field value array containing the field values of the table data according to the order of the field value sequence number corresponding to the field value.

Any one of the plurality of processors comprises means to allocate elements in the field value array of the first table data and elements of the field value array of the second table data to the plurality of the processors in the predetermined order by dividing the field value array into a plurality of sections according to the number of the plurality of processors, defining corresponding sections in the field value array of the second table data according to a value of an element at a boundary of the divided section in the field value array of the first table data, and adjusting the boundary of the sections so that a difference in a total number of elements in the field value array of the first data and elements in the field value array of the second table data among the plurality of sections falls within a predetermined tolerance.

Each of the plurality of processors comprises means to compare the element in the field value array of the first table data and the element in the field value array of the second table data allocated to each processor, and if it is determined that an element having a value matching that of the element in the field value array of the first table data allocated to each processor within a range of the section corresponding to each processor is present in the field value table of the second table data allocated to each processor, mark the element having the matching value in the field value array in the first table data.

Also, any one of the plurality of processors comprises means to allocate a plurality of portions to the plurality of processors by dividing the record number array of the first table data to the plurality of the portions, the number of the plurality of the portions being equal to the number of the plurality of processors.

Moreover, each of the plurality of processors comprises means to read out the record number from the allocated portion in the record number array of the first table data, read out the field value sequence number corresponding to the read out record number from the field value sequence number array of the first table data, determine whether an element in the field value array of the first table data corresponding to the read out field value sequence number has been marked, and if the element has been marked, classify the read out record number as the matching record, or otherwise classify the read out record number as the non-matching record.

According to a seventh aspect of the present invention, a program for realizing the information processing method according to the present invention is provided.

According to an eighth aspect of the present invention, a storage medium having a program according to the present invention recorded thereon is provided.

Advantages of the Invention

According to the present invention, in a shared-memory parallel processing environment, an information processing device which can realize parallel processing of large-scale data at a high speed can be provided by efficiently allocating large-scale data, particularly large-scale table data to a plurality of processors.

BEST MODE FOR CARRYING OUT THE INVENTION

In the following, various embodiments of the present invention will be described with reference to the accompanying drawings.

[Configuration of Computer System]

FIG. 1 is a schematic diagram showing an embodiment of a computer system that performs an information processing method using large-scale data in which the plurality of processors share the memory. As shown in FIG. 1, a computer system 10 includes p units of processors (CPU) 12-1, 12-2, . . . , and 12-p for executing programs to control the entirety and individual parts of the system, a shared memory such as a RAM (Random Access Memory) 14 for storing work data and the like, a ROM (Read Only Memory) 16 for storing programs and the like, a fixed storage medium 18 such as a hard disk, a CD-ROM driver 20 for accessing a CD-ROM 19, an interface (I/F) 22 disposed between the CD-ROM driver 20 or external network (not shown) and an external terminal for connection, an input apparatus 24 comprising a keyboard and mouse, and a CRT display apparatus 26. The CPU 12, the RAM 14, the ROM 16, the external storage medium 18, the I/F 22, the input apparatus 24, and the display apparatus 26 are connected to each other via a bus 28. Although not illustrated, each CPU may be provided with a dedicated local memory.

A program for performing the information processing method for large-scale data according to the present embodiment may be stored in the CD-ROM 19 and read by the CD-ROM driver 20, or may be stored in the ROM 16 in advance. Alternatively, the program may be read from the CD-ROM 19 for storage in a predetermined area of the external storage medium 18. Alternatively, the program may be supplied from an external source via the network (not shown), the external terminal, and the I/F 22.

A shared-memory multiprocessor system according to the present embodiment of the present invention may be implemented by the computer system 10 executing a program for performing the information processing method for large-scale data.

[Information-Block-Based Data Management Mechanism]

FIG. 2 is a drawing showing an example of table data for explaining a data management mechanism. This table data is stored in the computer as a data structure as shown in FIG. 3 by using the data management mechanism proposed in International Publication No. WO00/10103 described above.

As shown in FIG. 3, an array 301 (hereinafter simply referred to as "OrdSet") that assigns sequence numbers representing the order of internal data to sequence numbers representing the order of individual records of table data is provided in which the sequence numbers representing the order of internal data are arranged as values with respect to the respective table-data records. In this example, all of the table data are represented as the internal data, so that the record numbers of table data correspond to the sequence numbers representing the order of internal data.

As for gender, for example, it can be learned from the array OrdSet 301 that the sequence number representing the order of internal data corresponding to record 0 of the table data is "0". An actual gender value of the record having sequence number "0", which is either "male" or "female", is obtained by referring to a pointer array 302 (hereinafter simply referred to "VNo") that points to a value list 303 (hereinafter simply referred to "VL") in which actual values are sorted in a predetermined sequence. The pointer array 302 stores pointers pointing to the items of the actual value list 303 according to the order of sequence numbers stored in the array OrdSet 301. With this arrangement, the gender field value corresponding to record "0" of the table data is obtained by: (1) extracting sequence number "0" corresponding to record "0" from the array OrdSet 301; (2) extracting item "1" corresponding to sequence number "0" from the pointer array 302 pointing to the value list; and (3) extracting item "female" from the value list 303 that is indicated by item "1" extracted from the pointer array 302 pointing to the value list.

Any field value can be similarly obtained with respect to other records and similarly with respect to gender and height.

In this manner, table data is represented by a combination of the value list VL and the pointer array VNo pointing to the value list, and this combination is referred to as "information block". In FIG. 3, the information blocks regarding gender, age, and height are shown as information blocks 308, 309, and 310, respectively.

If a single memory (defined as meaning a single address space for access despite one or more physical entities) is used, it suffices for a single computer to store in the memory an array OrdSet for ordered set and a value list VL and pointer array VNo constituting each information block. In order to maintain a large number of records, however, it is desirable to perform parallel processing on the large number of records since the required memory size increases in response to the record size.

Thus, in the present invention, the large number of records stored in the memory are divided and allocated to the plurality of processors, the plurality of processors access the record data allocated to the processor, and the plurality of processors perform parallel processing of the large-scale data.

In the large-scale table data, the size of the value list VL also becomes large. Then, in the present invention, the large-scale value list VL stored in the memory is divided and allocated to the plurality of processors, and the plurality of processors perform parallel processing of the large-scale data.

[Parallel Merging]

Firstly, in the shared-memory multiprocessor system according to the embodiment of the present invention, information processing methods of merging two sets of large-scale data, that is, parallel merging processing will be described. Here, the shared-memory multiprocessor system represents a system in which a plurality of processors share the memory for performing the parallel processing. The two sets of large-scale data are a first array and a second array in which values without duplication are stored in a predetermined order, which is ascending or descending order. The value list VL of the data management mechanism is an example of such an array. These arrays are stored in the memory, to which the plurality of processors can access. In the following description, the number of processors is supposed to be four for simplification.

FIG. 4A is a diagram illustrating a first list (LIST-1) 401 and a second list (LIST-2) 402, which is an example of two sets of large-scale data to be merged in this embodiment, and FIG. 4B is a diagram illustrating a resultant third list (LIST-3) 403 after merging. Actually, the number of elements in a list can reach several millions or more, but an example with several tens of elements will be described for simplification. The elements in the first list 401 and the second list 402 are arranged in the ascending order of the values. The third list 403 after merging is also arranged in the ascending order of the values. The numbers of 0, 1, 2, . . . on the left side of the array represent the orders of the elements in the array. The order corresponds to an address on the memory where the element in the array is stored.

In the parallel merging processing, any one of the processors first divides the first list 401 into four sections according to the number of the processors. FIGS. 5A, 5B, 6A, and 6B are diagrams illustrating various examples of dividing the two lists into sections. At this time, if the second list 402 is divided into four sections simply to make the size of the sections equal, the first list 401 and the second list are divided as shown in FIG. 5A. Values 100, 110, 120, 160, 180 from the first list 401 and values 80, 90, 100, 120, 180, 190 from the second list 402 are allocated to a CPU-0, and values 200, 210, 220, 250, 260 from the first list and values 201, 230, 250, 290, 300, 310 from the second list 402 are allocated to a CPU-1, and the same applies to the following processors. However, such simple sectional division causes a problem. For example, a value of the 11th (=order 10) element from the beginning of the first list 401 is 300, and this element is allocated to a CPU-2. On the other hand, a value of the 11th (=order 10) element from the beginning of the second list 402 is also 300, but this element is allocated to the CPU-1. Therefore, since such sectional division causes the same value 300 to be allocated to different CPUs, two CPUs should cooperate with each other for processing a certain value.

In order to avoid the above problem, according to the parallel merge processing of this embodiment, the plurality of sections in the second list 402 are determined according to the value of the element at the boundary of the divided sections in the first list 401. That is, the last element in a section of the second list 402 is selected so that the last element in the section of the second list has the same value as that of the last element in a corresponding section of the first list 401 if the value of the last element in the section of the first list 401 is present in the second list 402. If there are no matching values, the last element in the section of the second list 402 is selected so that the value of the last element in the corresponding section of the first list 401 is larger than the last element in the section of the second list 402 and smaller than the first element in a subsequent section of the second list 402. An example of the sectional division determined as above is shown in FIG. 5B. In this sectional division example, ten elements are allocated to the CPU-0, nine elements to the CPU-1, ten elements to the CPU-2, and fourteen elements to the CPU-3. It is needless to say that if there are no matching values, the last element in the section of the second list 402 may be selected so that the value of the first element in the subsequent section in the corresponding first list 401 is larger than the last element in the section of the second list 402 and not larger than the first element in the subsequent section of the second list 402. Once the value of the element at the boundary is determined based on such a criterion, the sectional division as shown in FIG. 6A is achieved.

In the parallel merge processing according to this embodiment, the total number of elements allocated to each processor is taken into consideration so that the throughput of each processor becomes as even as possible. For this purpose, in the parallel merge processing, the boundary of the sections is adjusted so that a difference in the total number of the elements of the first list 401 and the elements of the second list 402 among the plurality of sections falls within a predetermined tolerance. For example, in the sectional division shown in FIG. 5B, the total number of the elements allocated to the CPU-1 is 9, the total number of the elements allocated to the CPU-3 is 14, and therefore, this leads to a difference in the total of 5. On the other hand, by adjusting the boundary of the first list 401, as shown in FIG. 6A, for example, the difference in the total of the number of elements allocated to each processor can be kept at two or less. Details of the sectional dividing method in the parallel merge processing will be described later.

Now, each of the plurality of processors compares the elements of the first list 401 and the elements of the second list 402 sequentially from the beginning, the first list and the second list being allocated to the processor, counts the total number of elements in the second list 402 having a value smaller than a specific element in the first list 401, and similarly counts the total number of elements in the first list 401 having a value smaller than a specific element of the second list. Such number of elements is obtained by counting the number of elements in the second list 402 having a value falling between the specific element of the first list 401 and the element immediately before this specific element (if the specific element is the first element, a value smaller than the value of this first element) and by aggregating the counted number, and this is also the case with the second list 402. Next, a ranking number of the specific element from the first list 401 within the section is calculated (i.e., among the elements from the first list 401 along with the elements from the second list 402) by adding a ranking number of the specific element in the first list 401 (starting at 0 in this example) to the aggregated value corresponding to the specific element in the first list 401, and this is also the case with the specific element in the second list 402.

FIGS. 7A-7D are explanatory diagrams of a process for sequencing elements in a section by a CPU-0 based on an example of sectional division in FIGS. 5A, 5B, 6A and 6B. FIG. 7A shows count values of the number of the above elements as Count-1 and Count-2. FIG. 7B shows values obtained by aggregating the counted number as Aggr-1 and Aggr-2. FIG. 7C shows ranking numbers of respective elements in the section as Aggr-1 and Aggr-2. FIG. 7D shows a third list (LIST-3) obtained by merging a first list and a second list within a range of the sections allocated to the CPU-0.

Each processor counts the number of unique values of the elements included in the section allocated to the processor while sequencing the elements in the section. The number of the unique values is equal to a maximum ranking number+1 (in this example, the ranking number begins at 0) of the merged list in the section. Alternatively, the number of the unique values can be also obtained by counting up the number when a new value appears in counting the number of the elements in FIG. 7A.

The CPU-1, CPU-2, and CPU-3 execute the sectional division and sequencing similarly to the CPU-0 as described with reference to FIGS. 5A, 5B, 6A, 6B and 7A-7D. At this time, the processors CPU-0 to CPU-3 run in parallel. FIGS. 8A-8D are diagrams illustrating ranking numbers of the elements and the number of unique values in the section calculated by each processor.

Once the ranking numbers of the elements and the number of the unique values in the section allocated to each of the plurality of processors are determined, each of the plurality of processors adds the total number of the unique values of the elements included in the section preceding the section allocated to the processor with respect to a predetermined order to the ranking numbers assigned to all the elements in the first list 401 and the second lists allocated to the processor. This allows all of the values stored in the first list 401 and the second list 402 to be sequenced in the predetermined order. FIGS. 9A-9D show diagrams illustrating thus resultant ranking numbers of elements allocated to each CPU in the merged list. It is appreciated that the result is the same as a merged third list 403 shown in FIG. 4B.

[Sectional Division]

Now, a sectional division process according to an embodiment of the present invention executed by any one of a plurality of processors will be described. The sectional division process includes dividing Array1 and Array2, which are two sets of list in the ascending order (arrays containing elements in the order of a magnitude of each element) into N pieces of sections, considering balance of the number of elements to be divided. The size of Array1 (that is the number of elements) is S1, the size of Array2 is S2, the i-th (i=0, 1, 2, . . . , S1-1) element of Array1 is represented by Array1 [$i$], and the j-th (j=0, 1, 2, . . . , S2-1) element of Array 2 is represented by Array2 [$j$]. Also, the number of elements in Array1 allocated to a section k=0, 1, 2, . . . , N-1 is represented by n1[$k$], and the number of elements in Array2 as n2 [$k$]. In the following explanation, an operation such as division is an integer arithmetic operation.

The sectional division processing has an object to divide the list such that NUMBER OF ALLOCATED ELEMENTS=n1[$k$]+n2[$k$] is approximately equal to DESIRED VALUE=(S1+S2)/N; for all k. Thus, the list is divided such that a difference between the number of allocated elements and the desired value falls within a range of a predetermined margin M, that is:

Condition:|(n1[k]+n2[k]|−(S1+S2)/N|<M is satisfied.

At this time, constraints for values at the boundary of the sections, that is, constraints for values being divided into an identical section when the values are equal to each other and are defined as follows:

Array1[$n1[k]$−1]=Array2[$n2[k]$−1]       CONSTRAINT 1 or

Array1$[n1[k]$−1]>Array2$[n2[k]$−1]

and

Array1$[n1[k]$−1]<Array2$[n2[k]]$.       CONSTRAINT 2

If the above conditions are not satisfied, the number n1[$k$] of elements to be divided into Array1 is changed by a predetermined amount diff in order to adjust the boundary of division.

FIGS. 10 and 11 are flowcharts for explaining a sectional division processing according to this embodiment of the present invention. One processor in a shared-memory multiprocessor system executes the sectional division in which the numbers of elements are balanced according to the following procedure.

Step 1001: An initial value k=0 and a margin M of the section are set.

Step 1002: The number of candidate elements n1[$k$] of a section k in Array 1 is set as n1[$k$]=S1/n. Also, an adjustment amount diff or the number of elements in the section k in Array1 is set as diff=n1[$k$]/2.

Step 1003: An element Array2[$n2[k]$−1]] matching Array1 [$n1[k]$−1], which is at the end of the section k in Array1, is searched for by a bisection method.

Step 1004: If there is no matching element Array2 [$n2[k]$−1]], the process goes to Step 1005, otherwise the process goes to Step 1006.

Step 1005: The maximum Array2[$n2[k]$−1]] which satisfied a condition: Array1 [$n1[k]$−1]>Array2[$n2[k]$−1]] is detected and the process goes to Step 1006.

Step 1006: $n2[k]$ found at Step 1004 or Step 1005 is set to the number of candidate elements in the section k in Array 2.

Step 1007: A condition that says a difference in the total number of candidate elements and the desired value falls within a range of the predetermined margin M, that is, |(n1 [$k$]+n2[$k$]|−(S1+S2)/N|<M is checked. If the condition is not met, the process goes to Step 1008. If the condition is met, the process goes to Step 1013.

Step 1008: In order to determine the direction of adjustment, it is determined whether (n1[$k$]+n2[$k$])−(S1+S2)/N>0 or not, and if the determination result is positive, the process goes to Step 1009, otherwise the process goes to Step 1011.

Step 1009: It is determined whether the adjustment amount diff is 0 or not, and if it is 0, the process goes to Step 1013, otherwise the routine goes to Step 1010.

Step 1010: Using the adjustment amount diff, the number of elements in the section k in Array1 is changed according to:

$$n1[k]=n1[k]-diff$$

and then, the adjustment amount diff is changed according to:

$$diff=diff/2$$

and the process returns to Step 1003.

Step 1011: It is determined whether the adjustment amount diff is 0 or not, and if it is 0, the process goes to Step 1013, otherwise the routine goes to Step 1012.

Step 1012: Using the adjustment amount diff, the number of element in the section k in Array1 is changed according to:

$$n1[k]=n1[k]+diff$$

and then, the adjustment amount diff is changed according to:

$$diff=diff/2$$

and the process returns to Step 1003.

Step 1013: The current n1[$k$] and n2[$k$] are determined as the number of elements allocated to the section k.

Step 1014: It is determined whether the subsequent section is present or not (k<N), and if it is present, the process goes to Step 1015, otherwise the section division processing is finished.

Step 1015: The section k is updated by k=k+1, and the process returns to Step 1002.

In a preferred embodiment, the above sectional division processing is simplified. For example, assuming that once the allocation of a first section is has been finished, n1 elements in Array1 are allocated to the section and n2 elements in Array2 are allocated to the section. Subsequent section allocations can be achieved by applying exactly the same processing as that in the first sectional division to the second and subsequent sectional division except that the number of the sections is set as N=N−1, the beginning of Array1 is moved from Array1[0] to Array1[$n1$] (i.e., the elements from Array1[0] to Array1 [$n1$−1] are deleted) and the beginning of Array2 is moved from Array2[0] to Array2[$n2$] (i.e., the elements from Array2 [0] to Array1[$n2$−1] are deleted).

More specifically, in higher sectional division processing, exactly the same processing steps can be applied to all the sections as follows: n1[$k$] is substituted by n1, n2[$k$] is substituted by n2. Then, once the division of a single section is finished, the allocated elements in the list are deleted by substituting such that:

$N \leftarrow N-1$ $S1 \leftarrow S1-n1$ $S2 \leftarrow S2-n2.$

In other words, suffixes in the arrays are substituted as follows:

Array1[0]←Array1[n1]

Array1[1]←Array1[n1+1]

...

Array2[0]←Array2[n2]

Array2[1]←Array2[n2+1]

....

[Example of Parallel Merge Processing]

Now, an example of merging two ascending-order lists shown in FIG. 4A using four processors will be described. In the following description, these two ascending-order lists are supposed to be in the memory 14 of the computer system 10, but these ascending-order lists may be received from an outside of the computer system through an interface 22, for example, using communication means.

FIGS. 12A, 12B, 13A, 13B are explanatory diagrams of a first step to a fourth step, respectively, in an embodiment of the parallel merge processing according to the present invention. In the first step, any one or more of processors in the computer system 10 prepares two ascending-order lists of the LIST-1 and LIST-2 on the memory 14 (FIG. 12A). Here, LIST-1[0] denotes "100", which is the first element in the LIST-1, LIST-1[1] denotes "110", which is the second element in the LIST-1, and the same applies to the subsequent. Also, LIST-2[0] denotes "80", which is the first element in the LIST-2, LIST-2[1] denotes "90", which is the second element in the LIST-2, and the same applies to the subsequent.

In the second step, any one of the processors (hereinafter, it is CPU-0, for example) adds respective count arrays Count-1 and Count-2 to the two ascending-order lists LIST-1 and LIST-2 in the memory and initializes elements in the count arrays to 0 (FIG. 12B) The elements in the count arrays are also represented as Count-1[0], Count-1[1] as is the case of the list arrays.

In the third step, CPU-0 specifies a section of values present only in one of the lists and excludes it from a processing range. As shown in FIG. 13A, the minimum value of the elements in the LIST-1 is 100 and the maximum value is 450. Also, the minimum value of the elements in the LIST-2 is 80 and the maximum value is 555. Therefore, any values smaller than the minimum value of the LIST-1 are present only in the LIST-2, while any values larger than the maximum value of the LIST-1 are present only in the LIST-2. Then, the range of these values, that is, the elements 80, 90 and the elements 460, 470, 480, 500, 550, 555 in the LIST-2 are excluded from the processing range. This third step may be omitted.

In the fourth step, the CPU-0 divides the range in the LIST-1 not excluded in the third step, that is, the twenty elements including the element 100 to the element 450, into four sections corresponding to the number of processors and allocates the sections to the four processors from CPU-0 to CPU-3. As shown on the left side in FIG. 13B, five elements from LIST-1[0] to LIST-1[4] are allocated to CPU-0, five elements from LIST-1[5] to LIST-1[9] are allocated to CPU-1, and five elements are also allocated to CPU-2 and CPU-3 similarly.

Next, the range of LIST-2 corresponding to the section in LIST-1 allocated to each of the CPUs is determined and allocated to each of the CPUs. In this embodiment, since LIST-2[0] to LIST-2[1] and LIST-2[17] to LIST-2[22] have been excluded in the third step, fifteen elements from LIST-2[2] to LIST-2[16] are allocated to the CPUs. The allocation to CPU-0 is started sequentially from LIST-2[2]. A boundary between the section allocated to CPU-0 and the section allocated to CPU-1 from LIST-2 is determined so that a value of the first element to be allocated from LIST-1 to CPU-1 matches a value of the first element to be allocated from LIST-2 to CPU-1 or a value of the first element to be allocated from LIST-1 to CPU-1 is larger than a value of the last element to be allocated from LIST-2 to the CPU-0 and smaller than a value of the first element to be allocated from LIST-2 to CPU-1. The boundary determined as above is shown on the right side in FIG. 13B.

In this embodiment, the number of elements allocated from LIST-2 to each CPU is four to CPU-0, four to CPU-1, four to CPU-2, and three to CPU-3. As a result, from a combination of LIST-1 and LIST-2, nine elements, nine elements, nine elements, and eight elements are allocated to CPU-0, CPU-1, CPU-2 and CPU-3, respectively, and the throughput of each of the CPUs is found to be substantially equalized. If the throughput of each of the CPUs varies from CPU to CPU, it may be necessary to apply the above sectional division method.

In the fifth step, each CPU compares the elements in the LIST-1 and LIST-2 allocated to the processor sequentially from the beginning, counts the number of elements of one list positioned between elements of the other list, while counting the number of unique values of the elements from both the lists. FIGS. 14A-14F are explanatory diagrams of the fifth step executed in CPU-0 as an example. In FIGS. 14A-14F, a linear arrow represents a current comparison position, while a curved arrow represents movement of the current comparison position.

Referring to FIG. 14A, CPU-0 compares LIST-1[0] and LIST-2[2]. It is determined that the both values are identical, the CPU-1 advances the current comparison position of the LIST-1 side and the LIST-2 side by one, respectively, and increments the number of unique values (corresponding to the value 100) from 0 to 1 at the same time.

Referring to FIG. 14B, in comparing LIST-1[1] and LIST-2[3], CPU-0 determines that LIST-1[1]=110<LIST-2[3]=120, and then CPU-0 increments Count-2[3], advances the current comparison position on the LIST-1 side by one and increments the number of unique values (corresponding to the value 110).

Referring to FIG. 14C, in comparing LIST-1[2] and LIST-2[3], CPU-0 determined that LIST-1[2]=LIST-2[3]=120, and both the values are identical, and then CPU-0 advances the respective current comparison positions on the LIST-1 side and the LIST-2 side by one and increments the number of unique values (corresponding to the value 120) at the same time.

Referring to FIG. 14D, in comparing LIST-1[3] and LIST-2[4], CPU-0 determines that LIST-1[3]=160<LIST-2[4]=180, and then CPU-0 increments Count-2[4], advances the current comparison position on the LIST-1 side by one and increments the number of unique values (corresponding to the value 160).

Referring to FIG. 14E, in comparing LIST-1[4] and LIST-2[4], CPU-0 determines that LIST-1[4]=LIST-2[4]=180, and both the values are identical, and then CPU-0 advances the current comparison position on the LIST-1 side and the LIST-2 side by one and increments the number of unique values (corresponding to the value 180) at the same time.

Referring to FIG. 14F, since the end of the elements of the LIST-1 allocated to CPU-0 has been reached, CPU-0 advances the current comparison position on the LIST-2 side by one and increments the number of unique values (corresponding to the value 190). At this stage, since the end of the elements in the LIST-2 allocated to CPU-0 has been reached, CPU-0 finishes the count processing in the section allocated to the processor.

Similar to CPU-0, CPU-1, CPU-2, and CPU-3 compare the elements in the LIST-1 and LIST-2 allocated to each processor sequentially from the beginning, counts the number of elements in one of the lists positioned between the elements in the other of the lists, and counts the number of unique values of the elements from the both lists at the same time. FIGS. 15A-15F are diagrams illustrating thus obtained count result. FIGS. 15A and 15F show the number of unique values for the section excluded in the third step. This number may be set by CPU-0, for example.

Next, in the sixth step, each CPU aggregates the number of elements, which has been counted in the fifth step, in one of the lists positioned between the elements in the other of the lists. FIGS. 16A-16C and 17A-17C are diagrams for explaining the aggregation. As shown in FIG. 16B, CPU-0 aggregates the elements in the array Count-2 allocated to the processor. Since all the elements in the array Count-1 allocated to CPU-0 are equal to 0, the value of the elements is not changed by the aggregation. For the convenience of description, the aggregated count is represented as an array Aggr-1 and an array Aggr-2. Calculation of this aggregation can be represented as the following expression:

Aggr-2[2]=Count-2[2]=0

*Aggr*-2[3]=Count-2[2]+Count-2[3]=0+1=1

*Aggr*-2[4]=Count-2[3]+Count-2[4]=1+1=2

*Aggr*-2[5]=Count-2[4]+Count-2[5]=2+0=2

CPU-1, CPU-2, and CPU-3 accumulate the Count array similarly to the CPU-1, as shown in FIGS. 16C, 17A, and 17B. The section excluded in the third step has the elements, which has been kept equal to 0, in the Count array, and therefore aggregation is not required.

Next, in the seventh step, each CPU ranks the elements in LIST-1 and LIST-2 allocated to the processor. Ranking can be in principle separated to two stages of intra-section ranking and inter-section ranking across all the sections. However, since the both rankings are realized by addition calculation, in practice, the both rankings are executed at the same time. FIGS. 18A to 18C and 19A to 19C are diagrams for explaining these rankings.

An intra-section rank of a specific element in one of the lists allocated to one CPU is obtained by adding the rank (rank begins with 0) of the specific element in the one list within the allocated section to the aggregated total number calculated for the specific element. For example, in an example of CPU-0 shown in FIG. 18B, the intra-section rank of LIST-2[3] is appreciated to be 2 by adding the intra-section rank of LIST-2[3], i.e., 1 (LIST-2[2] has the rank of 0) to Aggr-2[3]. Since LIST-2[3] has the rank subsequent to LIST-1[0]=LIST-2[2]=100 and LIST-1[1]=110 in the section allocated to CPU-0, the rank of LIST-2[3] is definitely 2.

In order to calculate the rank across all the sections, it may be necessary to add the total number of unique values in the section preceding the section to the rank within the relevant section. In the example of CPU-0 shown in FIG. 18B, since the section excluded in the third step (FIG. 18A) is present prior to the section allocated to CPU-0, it is may be necessary to add the number of the unique values in this section, which is equal to 2, to the rank within the relevant section. In the example of CPU-1 shown in FIG. 18C, the total value of the number of unique values in the section excluded in the third step, which is equal to 2, and the number of unique values in the relevant section allocated to the CPU-0, which is equal to 6, i.e., the total value 8 of 2 and 6, is added to the rank in the relevant section allocated to CPU-1. Referring to FIG. 19B, it can be seen that the rank of LIST-1[15]=390 is equal to Aggr-1[15]=23 and the rank of the LIST-2[14]=400 is equal to Aggr-2[14]=24. FIG. 20 shows ranking numbers of the elements after execution of the seventh step.

Since all the elements in the LIST-1 and all the elements in the LIST-2 are ranked by a series of ranking numbers shared by both lists as a result of the above processing, merging of LIST-1 and LIST-2 has been substantially finished. For later processing, the list can be created by (1) a simplified method or (2) a highly efficient method, if it is necessary to retain a list LIST-3, which is actually generated by merging LIST-1 and LIST-2, on the memory.

FIGS. 21-23 are explanatory diagrams of the merge list creating processing (simplified method) in an embodiment of the parallel merge processing according to the present invention. The arrays Aggr-1, LIST-1, LIST-2 and Aggr-2 are the same as the arrays shown in FIG. 20. LIST-3 is an array which is created by actually merging LIST-1 and LIST-2. In this merge list creating processing, each CPU sets corresponding elements in the LIST-3 for a section of LIST-1 and a section of LIST-2 allocated to the processor. In this example, among the sections excluded in the third step LIST-2[0] and LIST-2[1] are allocated to CPU-0, while LIST-2[17] to LIST-2 [22] are allocated to CPU-3, and the subsequent processing is executed.

In the first step, as shown in FIG. 21, CPU-0 initially transfers an element LIST-1[0]=100 assigned a ranking number Aggr-1[0]=2 to LIST-3[2], an element LIST-1[1]=110 assigned a ranking number Aggr-1[1]=3 to LIST-3[3] and the same applies to the following. The CPU-2, CPU-3 and CPU-4 also transfer elements of LIST-1 allocated to the processor to LIST-3 at the same time as the CPU-1.

In the second step, as shown in FIG. 22, CPU-0 initially transfers LIST-2[0]=80 assigned a ranking number Aggr-2[0]=0 to LIST-3[0], and then, LIST-2[1]=90 assigned a ranking number Aggr-2[1]=1 to LIST-3[1] and the same applies to the following. CPU-2, CPU-3 and CPU-4 also transfer elements of LIST-2 allocated to the processor to LIST-3 at the same time as the CPU-1.

As a result of this transfer processing, a complete form of LIST-3, as shown in FIG. 23, is obtained. However, in the simplified method, if the same value is present both in LIST-1 and LIST-2, the value is transferred from both of LIST-1 and LIST-2 to LIST-3, efficiency will be reduced in case where large duplication exists between LIST-1 and LIST-2. To the contrary, with the highly efficient method, in the fifth step of the parallel merge processing shown in FIGS. 14A-14F, any elements, which belong to LIST-1 and do not belong to LIST-2, among elements included in LIST-2 are tagged while comparing the element in LIST-1 with the element in LIST-2. And in the second step of the merge list creating processing shown in FIG. 22, only the elements with the tags in the elements of LIST-2 are transferred to LIST-3. Thus, duplicated transfer is avoided, and efficiency is improved.

[Example of Parallel Matching Processing]

Lastly, an example of the parallel matching processing according to the present invention will be described. The matching processing means that in case where two data of data A and data B are present, a matched set in which a matching counterpart is present and an unmatched set in which a matching counterpart is not present are created from the own data (that is, original set) based on whether the same value as that of the own data is present in the other data or not. In the following description of the embodiment, the data is table data suitable for a data management mechanism based on the previously described information block. Also, since the same processing is carried out on the data A side and the data B side, only one data side will be described. The processing on the data A side and the processing on the data B side may be carried out in parallel if the sufficient number of processors are present, but the processing may be sequential such that the processing on the data B side is carried out after the processing on the data A side is finished.

FIGS. 24A, 24B are explanatory diagrams for matching processing of two table data (table A and table B). The table A and table B with fields such as "gender (Sex)" and "years old (Age)" are first narrowed down to records with the "Sex"=Woman. Relating to this narrowed down table, if a field value of the "Age" matching the field value of a record field "Age" in the own table is present in the other table, the record on the own table is classified into the matched set, and otherwise the record is classified into the unmatched set. Referring to FIGS. 24A, 24B, the value 18 of the "Age" in the record 0 on the table A, for example, matches the value of the "Age" in the record 4 on the table B, and therefore the record 0 on the table A is classified into the match set, while the value 24 of the "Age" in the record 1 on the table A is not present in the field value of the "Age" in the table B, and therefore the record 1 on the table A is classified into the unmatched set.

FIGS. 25A, 25B show an example representing the example shown in FIGS. 24A, 24B as table data in the data management mechanism based on the information block. In the example of the table A in FIG. 25A, a record number array OrdSet' is created from an initial record number array OrdSet by narrowing the initial record number array as a result of searching for only "Woman", and then, a matched record number array OrdSet" and an unmatched record number array OrdSet'" are created from the record number array OrdSet' by the matching processing relating to the field "Age". In the embodiment of the present invention, since the data management mechanism based on the information block is used, the record number array has been converted with the information blocks for the field "Sex" and the field "Age" kept unchanged. For example, the second element in the record number array OrdSet" shown in FIG. 25A represents the record number 5, and field values of the record corresponding to the record number 5 are obtained from the respective information blocks. The value of the "Sex" of the record 5 is found to be Woman by retrieving the value 1 of an element VNo[5] of an value number array VNo for the "Sex" and retrieving VL[1] from a value list VL for the "Sex" using the retrieved value of the element VNo[5]. Similarly, it can be appreciated that the value of the "Age" of the record 5 is 20. This result corresponds to the example described using FIGS. 24A, 24B.

An operation of the parallel matching processing will be described in connection with a record number array OrdSet' after narrowing-down search as an original set, as shown in FIGS. 25A, 25B.

A first table data and a second table data are stored in a memory of a shared-memory processor system, and a plurality of processors are operable to access the first table data and the second table data stored in the memory. The first table data (Table A) and the second table data (Table B) are stored in the memory as the record number array OrdSet in which record numbers of respective records are stored in a predetermined record order, a value number array VNo in which value numbers corresponding to field values in a predetermined field on the record in the table data are stored according to the record number, and a value array VL in which the field values of the table data are stored according to the order of the value numbers corresponding to the field values. The shared-memory multiprocessor system according to the embodiment of the present invention classifies the records in the first table data into matched records and unmatched records, wherein a matched record is defined to be a record for which a record having the same field value as that of the record in the first table is present in the second table and an unmatched record is defined to be a record for which a record having the same field value as that of the record in the first table is not present in the second table.

FIGS. 26A, 26B are explanatory diagrams from the first step to the third step of an embodiment of the parallel matching processing according to the embodiment of the present invention. In the following explanation, mainly a table A side will be described, but the similar processing is also carried out on a table B side. If the number of processors is large, the processing of the table A side and the processing on the table B side can be executed in parallel in each step by allocating the processors to the table A side and the table B side. Alternatively, in order to use all the processors for the respective processing on the table A side and the table B side, the processing on the table A side and the processing on the table B side can be also carried out sequentially in each step.

In the first step, any one of the plurality of processors, the processor CPU-0, for example, divides a record number array OrdSet' and allocates it to the plurality of processors. A valid flag array ValidFlag indicating whether a value set to a value array VL is actually used or not is created and initialized. The size of the valid flag array is the same as the size of the value array.

In the second step, each processor sequentially reads out an element i of the record number array OrdSet' allocated to the processor, reads out a value number VNo[i] of the field "Age" corresponding to the read-out record number i, and sets a flag of an element corresponding to the value number in the valid flag array Valid Flag (That is, ValidFlag [VNo[i]]=1). By repeating this processing for the elements in the allocated record number array, each processor completes a valid flag array. It is noted that the same valid flag array may be completed by making separate valid flags for each processor in a valid flag array Valid_Flag defined as a bitmap and then, by executing a bit OR calculation for these valid flags.

In the third step, any one of the processors sequentially checks from the beginning of the array if a flag is set to an element in the valid flag array ValidFlag and if the flag is set, the element of the value array VL corresponding to the element with the flag set (that is, the suffixes match each other) is stored sequentially from the beginning of a valid value array VL'. In this manner, only the value of the field "Age" actually used by the record included in the OrdSet' is stored in the valid value array VL' in the ascending order.

Referring to FIG. 26A, since the first element OrdSet'[0] of the record number array is 0, VNo of the record 0 is read out, and the value is found to be 1, and thus, the valid flag ValidFlag[1] is set. When the similar processing is carried out for all the other record numbers 2, 3, 5, 6, 9, the completed ValidFlag is obtained. In the completed ValidFlag, ValidFlag[0], ValidFlag[1], ValidFlag[2] and ValidFlag[4] are set, the elements of the valid value array on the table A side are four of VL[0]=16, VL[1]=18, VL[2]=20, and VL[4]=24. The similar processing is carried out for the table B side shown in FIG. 26B, and the valid value array is obtained.

Next, by comparing the value array VL on the table A side and the valid value array VL' created on the table B side, elements of the value array VL on the table A side are classified into elements that are also present on the table B side and elements that are not present on the table B side. This processing may be executed in parallel by dividing the value array VL on the table A side into sections and allocating them to a plurality of processors.

FIGS. 27A, 27B are explanatory diagrams illustrating the fourth step to the fifth step of an example of the parallel matching processing according to the embodiment of the present invention.

In the fourth step, any one of the plurality of processors, the processor CPU-0, for example, divides the value array VL on the table A side into a plurality of sections according to the number of the plurality of processors, determines section of valid field value array VL' on the corresponding table B side according to a value of an element at the boundary of the divided sections of the value array VL on the table A side, and adjusts the boundary of the sections so that a difference in the total number of elements of the value array VL on the table A elements of the valid value array VL' on the table B side included in each of the plurality of the sections falls within a predetermined tolerance across the sections. This enables the elements of the value array VL on the table A side and the elements of the valid value array VL' on the table B side to be allocated to the plurality of processors in a predetermined order. In this step, the above sectional division processing is carried out. Since the sectional division processing has been already described in detail, further description will not be made.

In the fifth step, each of the plurality of processors compares the elements of the value array VL on the table A side and the elements of the valid value array VL' on the table B side allocated to the processor, and a certain element of the value array VL on the table A side having the matching value is marked, if an element having a value matching that of the certain element of the value array VL on the table A side allocated to the processor is present in the valid value array VL' on the table B side allocated to the processor within the range of the section corresponding to the processor. This marking is realized by an existence flag array ExistFlag in the example.

Referring to FIG. 27A, since an element matching the first element of the value array VL on the table A side is not present in the valid value array VL' on the table B side, a flag of the corresponding existence flag array ExistFlag is not set. As for a subsequent element 18 of the value array VL on the table A side, there is an element matching the element 18 is present in the valid value array VL' on the table B side, and a flag of the corresponding existence flag array ExistFlag is set. Similarly, the plurality of processors executes the marking in association with all the elements of the value array VL on the table A side in parallel. The same applies to the table B side.

This existence flag array is an array indicating if an element matching the element of the value array VL on the table A side is present on the table B side or not. Therefore, the value number of the field "Age" of the record is read out for each record on the table A side, it is determined whether a flag of the existence flag array is set or not using the value number as an index, and the record can be classified into a matched record or an unmatched record.

FIG. 28 is an explanatory diagram illustrating the sixth step to the seventh step of an embodiment of the parallel matching processing according to the embodiment of the present invention as above.

In the sixth step, any of the processors, the CPU-0, for example, divides the record number array OrdSet' on the table A side into a plurality of portions, wherein the number of the portions is equal to the number of the processors, and allocates the plurality of portions to the plurality of processors similarly to the first step.

Next, in the seventh step, each of the plurality of processors reads out a record number stored in the allocated portion in the record number array OrdSet' on the table A side, reads out a value number, which corresponds to the read out record number, from the value number array VNo on the table A side, determines if a flag is set to an element of the existence flag array ExistFlag corresponding to the read-out field value number, and classifying the read-out record number as a matched record and storing the read-out record number in a matched record number array OrdSet" if the flag is set, otherwise if the flag is not set, classifying the read-out record number as an unmatched record and storing the read-out record number in an unmatched record number array OrdSet"'.

Detail will be described more specifically referring to FIG. 28. For example, if the second element OrdSet"[1] from the beginning of the record number array is allocated to CPU-0, CPU-0 reads out OrdSet"[1]=2. Subsequently, CPU-0 reads out VNo[OrdSet"[1]]=VNo[2]=4 from the value number array VNo. Then, CPU-0 reads out ExitFlag[VNo[Ordset"[1]]]=ExitFlag[VNo[2]]=ExitFlag[4]=0 from the existence flag array ExitFlag. In this manner, CPU-0 determines that the a value matching the value 24 of the field "Age" of the record number 2 on the table A side is not present on the table B side, and stores the record number 2 in the unmatched record number array OrdSet"'. The similar processing is applied to all the elements of the OrdSet' on the table A side in parallel by the plurality of processors and also to all the elements of the OrdSet' on the table B side in parallel by the plurality of processors. If there are a sufficient number of processors, the processing on the table A side and the processing on the table B side can be executed in parallel.

As mentioned above, in the embodiment of the present invention, the computer system 10 is caused to execute a program to rearrange the order of records according to a field value of a predetermined field in the records. More specifically, in this embodiment, as mentioned below, the program causes each CPU to execute the above-mentioned processing steps or realize the above functions.

In this embodiment, OS (Linux (registered trademark), for example) is installed in the computer system 10. Initially, a CPU (CPU 12-1, for example) loads the program into the memory (shared memory 14, for example) under the control of the OS. Once the program is loaded into the memory, each of the CPU is caused to execute a predetermined function under the control of the OS in case where each of CPU12-1, 12-2, ... 12-p should perform processing. That is, each CPU reads out a predetermined processing step in the program stored in the shared memory 14 and performs the processing step. On the other hand, if a specific CPU should perform the processing, the specific CPU is cause to perform other predetermined functions under the control of the OS. That is, only the specific CPU reads out the other predetermined processing steps in the program stored in the shared memory 14 and performs the other predetermined processing steps. A location to store the program to be executed by each CPU is not limited to the shared memory 14 but may be a local memory (not shown) accompanying each CPU.

As mentioned above, in this embodiment, under the control of the OS, the program causes each CPU to perform specific functions and causes a specific CPU to perform other predetermined functions as necessary.

The present invention is not limited to the embodiments described above, and may be subject to various modifications within the scope of the invention described in claims, with explicit understanding that such modifications are within the scope of the present invention.

BRIEF DESCRIPTION OF THE DRAWINGS

FIG. 2 is a diagram illustrating an example of table data for explaining a data management mechanism.

FIGS. 4A, 4B are explanatory diagrams of a data structure to be merged according to an embodiment of the present invention.

FIGS. 5A, 5B are diagrams illustrating various examples of sectional division of two lists.

FIGS. 6A, 6B are diagrams illustrating various examples of sectional division of two lists.

FIGS. 7A-7D are explanatory diagrams of intra-section ranking based on the example of section division in FIG. 6B.

FIGS. 8A-8D are diagrams illustrating ranking of elements in a section calculated by CPU-0 to CPU-3 and the number of unique values based on the example of sectional division in FIG. 6B.

FIGS. 9A-9D are diagrams illustrating ranking of elements in a merge list obtained by applying parallel merge processing to the data structure sin FIGS. 4A, 4B according to the embodiment of the present invention.

FIG. 11 is a flowchart for explaining sectional division processing according to an embodiment of the present invention.

FIGS. 12A, 12B are explanatory diagrams of a first step and a second step of an embodiment of the parallel merge processing according to the present invention, respectively.

FIGS. 13A, 13B are explanatory diagrams of a third step and a fourth step of an example of the parallel merge processing according to the present invention, respectively.

FIGS. 14A-14F are explanatory diagrams of a fifth step of an example of the parallel merge processing according to the present invention, respectively.

FIGS. 15A-15F are diagrams illustrating a count result after execution of a fifth step of an example of the parallel merge processing according to the present invention, respectively.

FIGS. 16A-16C are explanatory diagrams of a sixth step of an example the parallel merge processing according to the present invention, respectively.

FIGS. 17A-17C are explanatory diagrams of the sixth step of an example of the parallel merge processing according to the present invention, respectively.

FIGS. 18A-18C are explanatory diagrams of a seventh step of an example of the parallel merge processing according to the present invention.

FIGS. 19A-19C are explanatory diagrams of the seventh step of an example of the parallel merge processing according to the present invention, respectively.

FIG. 20 is a diagram illustrating ranking of elements after execution of the seventh step of the embodiment of the parallel merge processing according to the present invention.

FIG. 21 is an explanatory diagram of a merge list creating processing (simplified method) in an embodiment of the parallel merge processing according to the present invention.

FIG. 22 is an explanatory diagram of a merge list creating processing (simplified method) in an embodiment of the parallel merge processing according to the present invention.

FIG. 23 is an explanatory diagram of a merge list creating processing (simplified method) in an embodiment of the parallel merge processing according to the present invention.

FIGS. 24A, 24B are schematic diagrams of matching processing of two table data.

FIGS. 26A, 26B are explanatory diagram from a first step to a third step of an example of the parallel matching processing according the embodiment of the present invention.

FIGS. 27A, 27B are explanatory diagram from a fourth step to a fifth step of an example of the parallel matching processing according an embodiment of the present invention.

EXPLANATION OF REFERENCE NUMERALS

Figure 1:
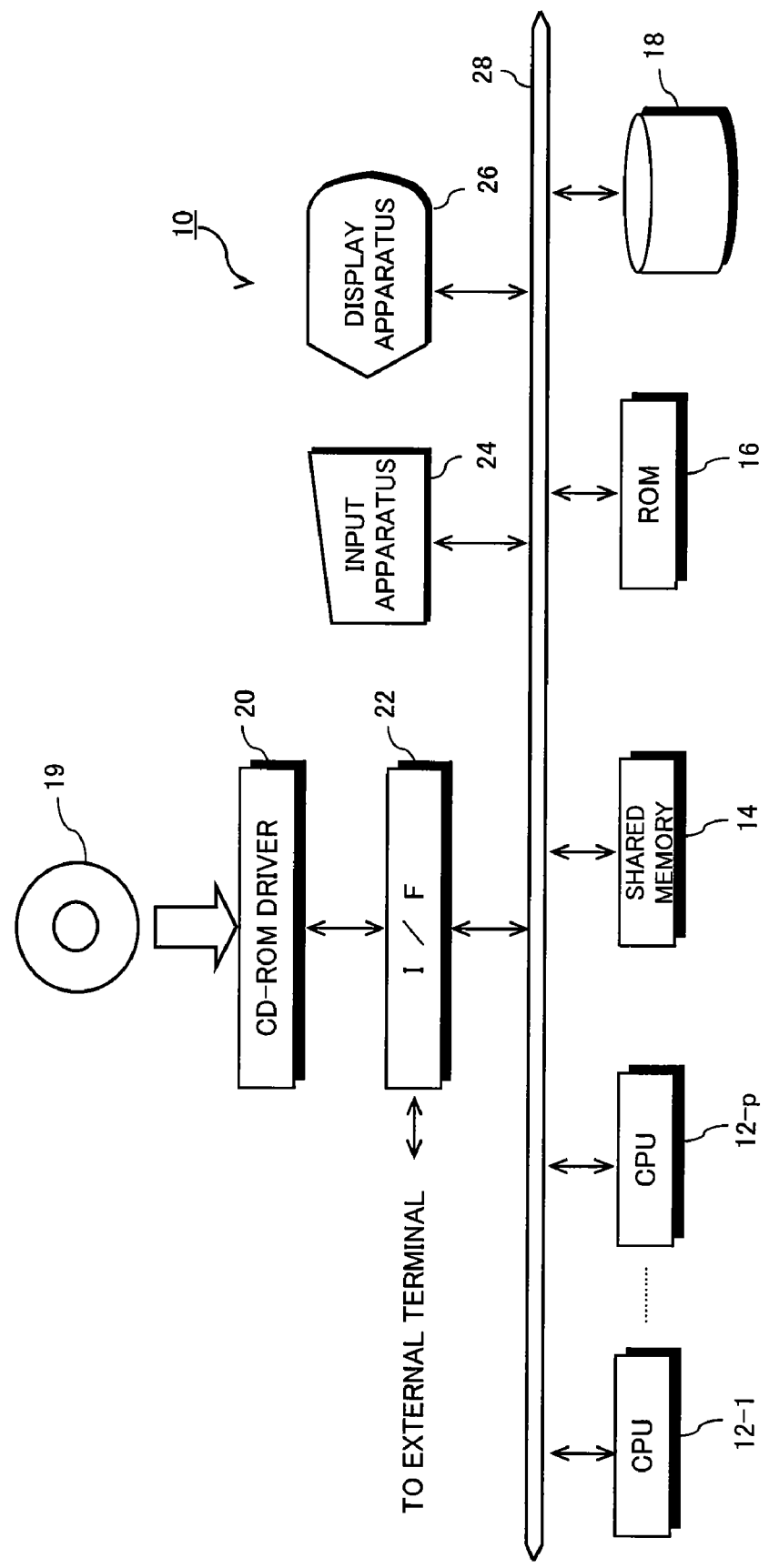
FIG. 1 is a schematic diagram of a computer system according to an embodiment of the present invention.
Figure 3:
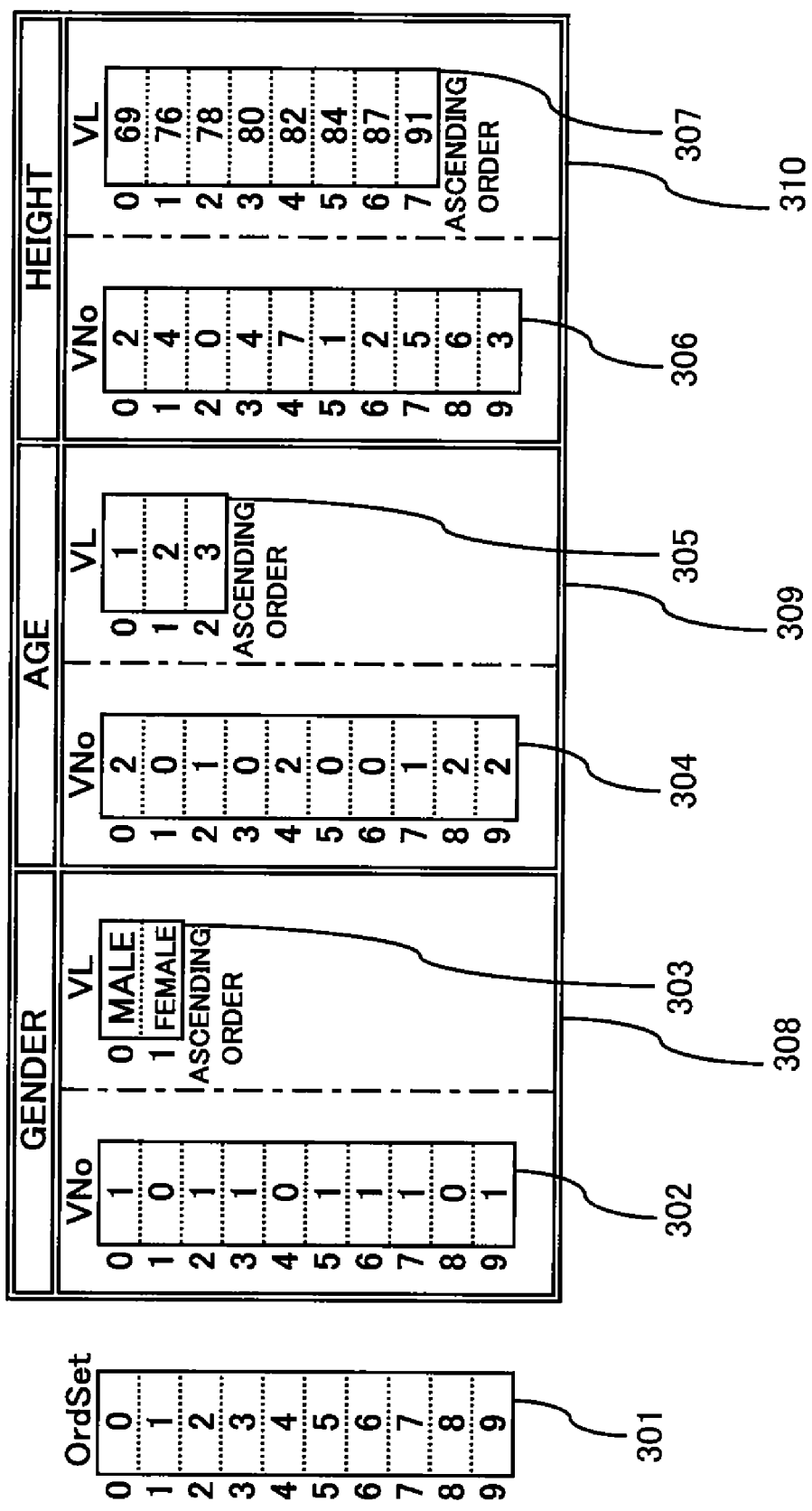
FIG. 3 is an explanatory diagram of the data management mechanism according to an embodiment of the present invention.
Figure 10:
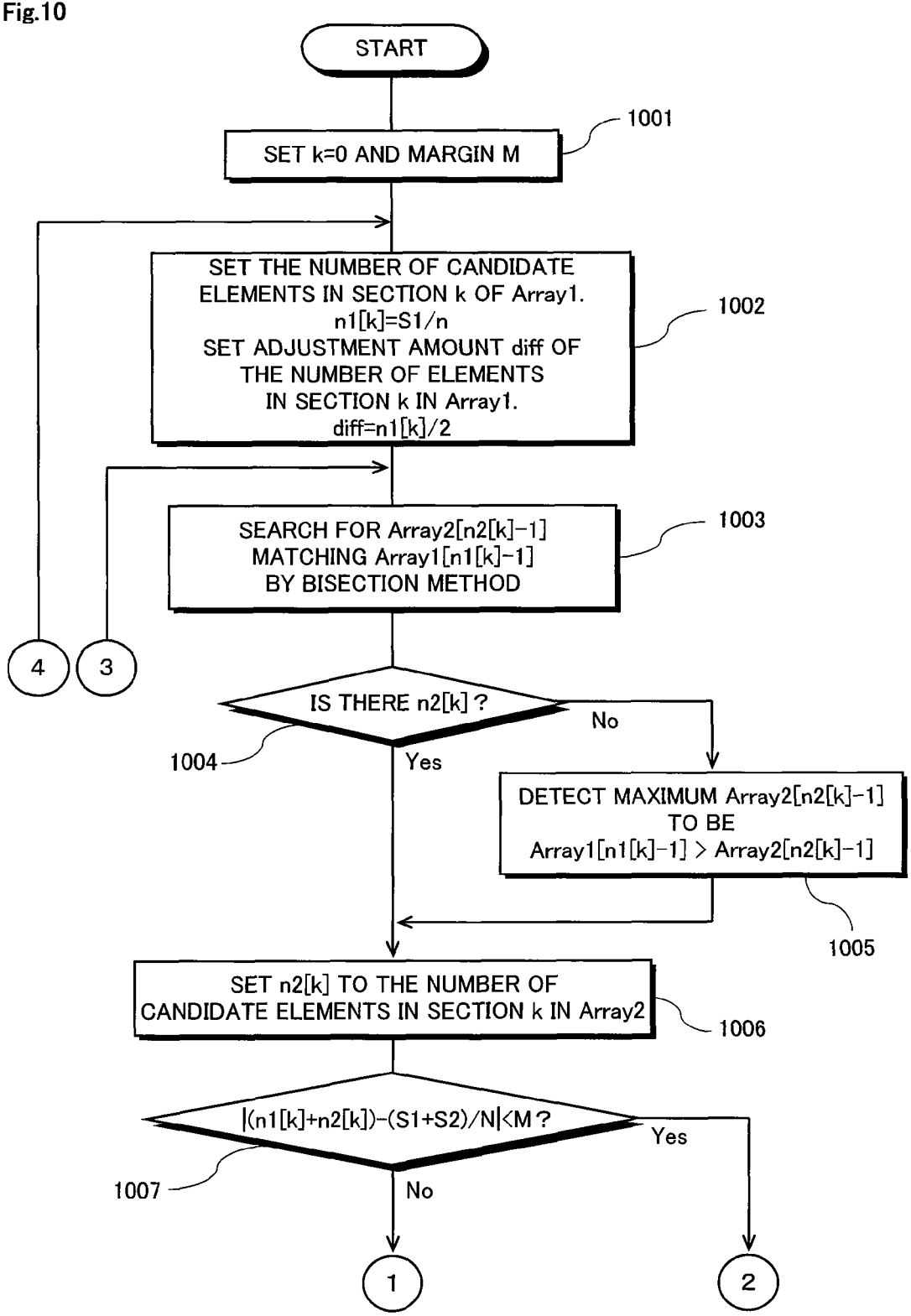
FIG. 10 is a flowchart for explaining sectional division processing according to an embodiment of the present invention.
Figure 25A:
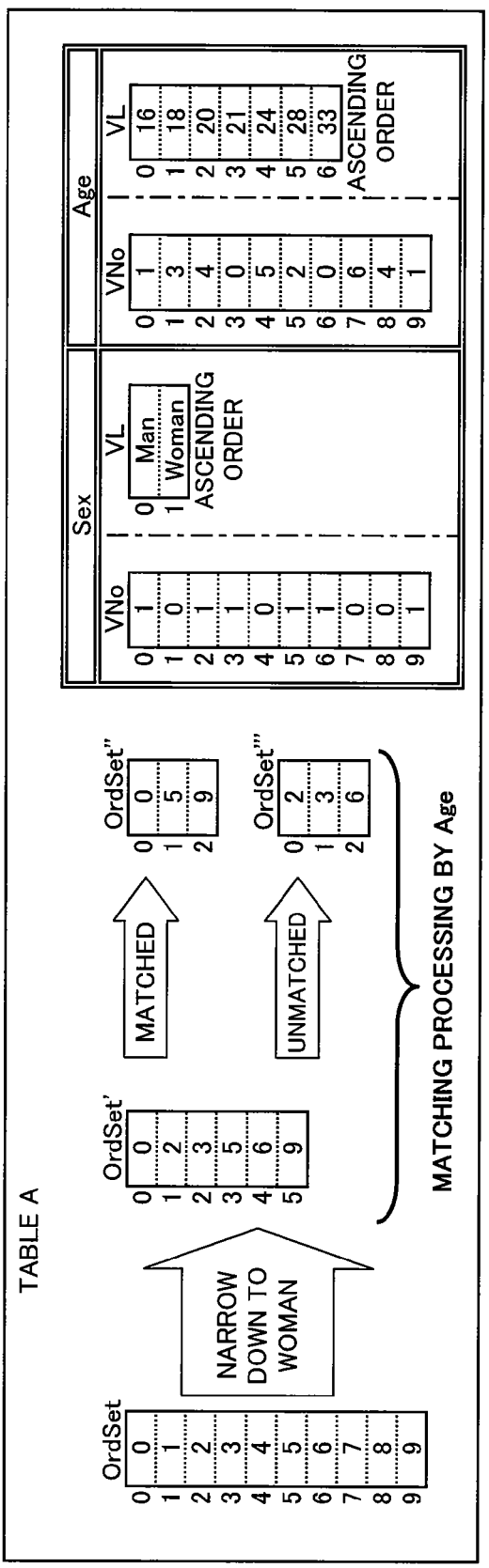
FIGS. 25A, 25B are schematic diagrams of the matching processing of two table data represented according to a data management mechanism based on a information block.
Figure 25B:
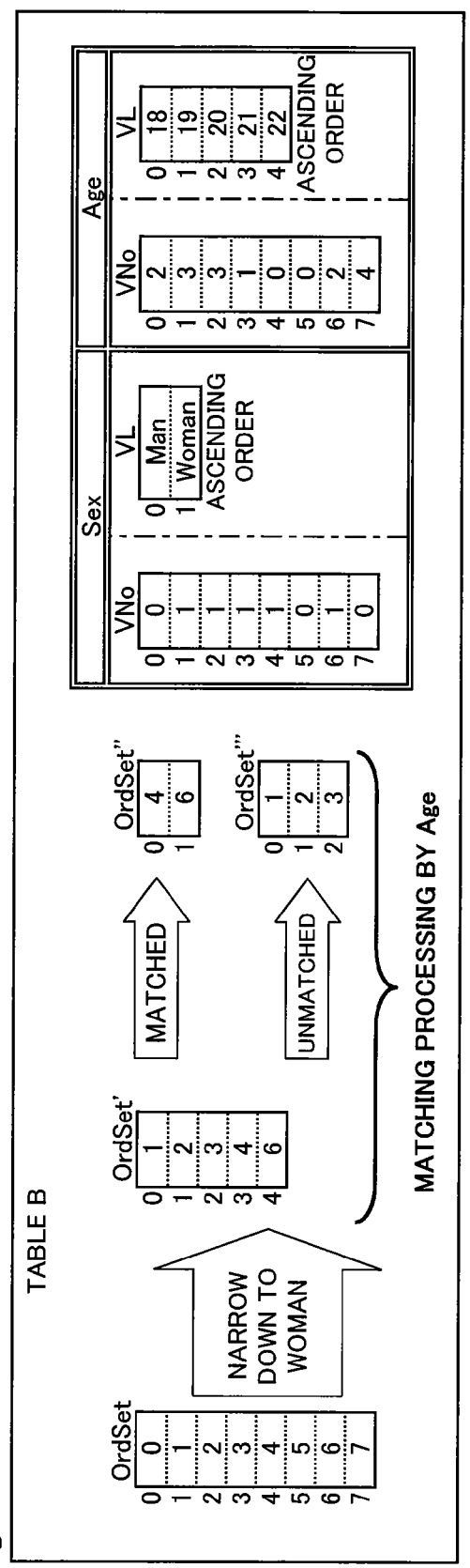
Figure 28:
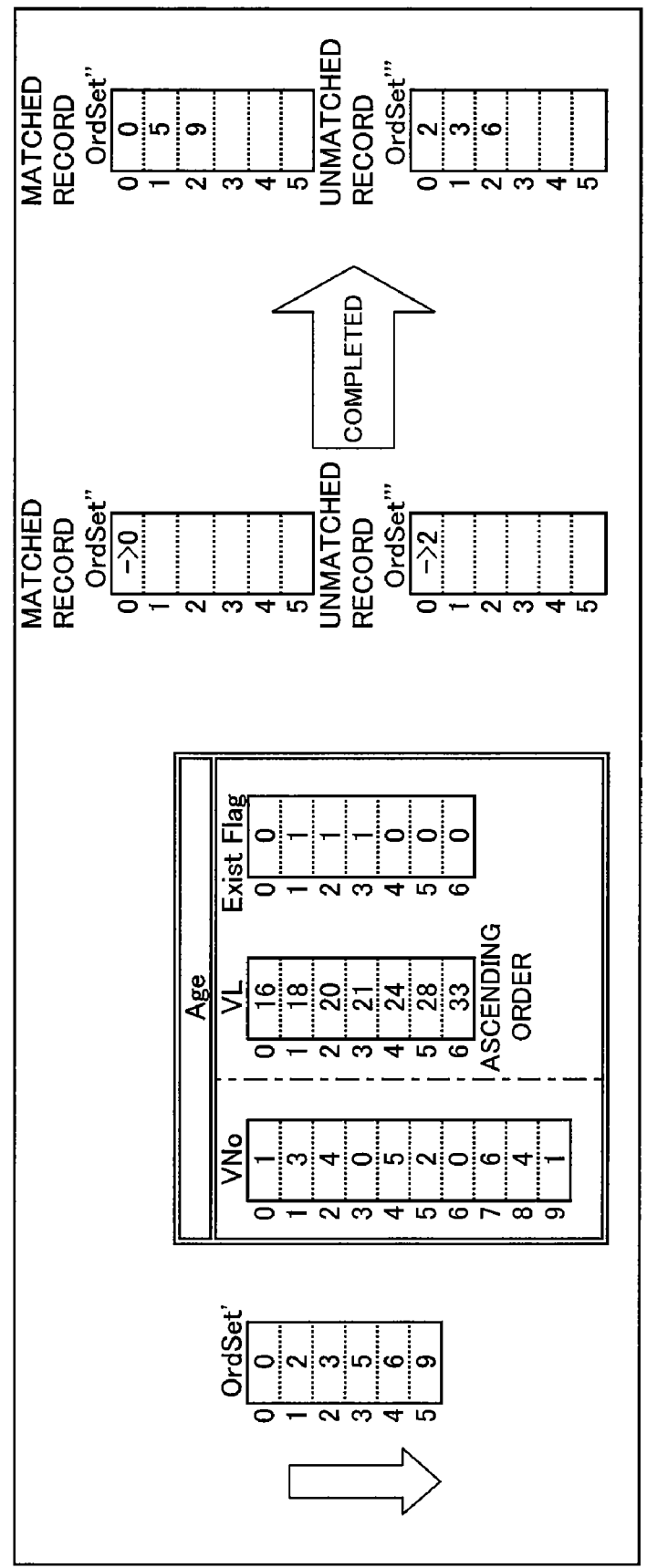
FIG. 28 is an explanatory diagram from a sixth step to a seventh step of an example of the parallel matching processing according the embodiment of the present invention.

10 Computer system
12-1, 12-2, . . . 12-$p$ CPU
14 Shared memory
16 ROM
18 Fixed storage device
20 CD-ROM driver
22 I/F
24 Input device
26 Display device

The invention claimed is:

1. An information processing method of distinguishing a value present in a second array among values contained in a first array, in a shared-memory processor system including
(a) a memory storing the first array and the second array storing values in a predetermined order, which is ascending or descending order, without duplication; and
(b) a plurality of processors configured to access the memory, wherein the method comprises steps of:
i. allocating elements of the first array and elements of the second array to the plurality of the processors in the predetermined order by dividing the first array into a plurality of sections according to the number of the plurality of processors, defining corresponding sections in the second array according to a value of an element at a boundary of the divided section in the first array, and adjusting the boundary of the sections so that a difference in a total number of elements in the first array and elements in the second array among the plurality of sections falls within a predetermined tolerance; and ii. comparing, by each of the plurality of the processors, elements in the first array and elements in the second array allocated to each processor, and, if determined that an element having a value matching that of an element in the first array allocated to each processor within a range of the section corresponding to each processor is present in the second array allocated to each processor, marking the element having the matching value in the first array.

2. The information control method as claimed in claim 1, further comprising:

a step of preparing a third array having the same size as that of the first array in the memory, wherein the step of marking the element having the matching value in the first array includes a step of setting a flag to an element in the third array corresponding to the element having the matching value in the first array.

3. An information processing method of classifying records included in a first table data into matching records and non-matching records based on whether there is a record in a second table data such that the record in the second table has the same field value as that of the record in the first table, in a shared-memory multiprocessor system including a memory storing the first table data and the second table data and a plurality of processors configured to access to the memory, wherein the first table data and the second table data are stored in the memory as a record number array containing record numbers of the respective records according to a predetermined record order, a field value sequence number array containing field value sequence numbers corresponding to field values of a predetermined field in the records of the table data according to the record number, and a field value array containing the field values of the table data according to the order of the field value sequence number corresponding to the field value, the information processing method comprising steps of:

allocating elements in the field value array of the first table data and elements of the field value array of the second table data to the plurality of the processors in the predetermined order by dividing the field value array into a plurality of sections according to the number of the plurality of processors, defining corresponding sections in the field value array of the second table data according to a value of an element at a boundary of the divided section in the field value array of the first table data, and adjusting the boundary of the sections so that a difference in a total number of elements in the field value array of the first data and elements in the field value array of the second table data among the plurality of sections falls within a predetermined tolerance;

comparing, by each of the plurality of the processors, elements in the field value array of the first table data and elements in the field value array of the second table data allocated to each processor, and, if determined that an element having a value matching that of an element in the field value array of the first table data allocated to each processor within a range of the section corresponding to each processor is present in the field value table of the second table data allocated to each processor, marking the element having the matching value in the field value array in the first table data;

allocating a plurality of portions to the plurality of processors by dividing the record number array of the first table data to the plurality of the portions, the number of the plurality of the portions being equal to the number of the plurality of processors; and reading out, by each of the plurality of the processors, the record number from the allocated portion in the record number array of the first table data, reading out the field value sequence number corresponding to the read out record number from the field value sequence number array of the first table data, determining whether an element in the field value array of the first table data corresponding to the read out field value sequence number has been marked, and if the element has been marked, classifying the read out record number as the matching record, or otherwise classifying the read out record number as the non-matching record.

4. A shared-memory processor system comprising:

(a) a memory storing a first array and a second array containing values in a predetermined order, which is ascending or descending order, without duplication; and (b) a plurality of processors configured to access the memory, wherein any one of the plurality of processors comprises means to allocate elements of the first array and elements of the second array to the plurality of the processors in the predetermined order by dividing the first array into a plurality of sections according to the number of the plurality of processors, defining corresponding sections in the second array according to a value of an element at a boundary of the divided section in the first array, and adjusting the boundary of the sections so that a difference in a total number of elements in the first array and elements in the second array among the plurality of sections falls within a predetermined tolerance; and each of the plurality of processors comprises means to compare elements in the first array and elements in the second array allocated to each processor, and, if determined that an element having a value matching that of an element in the first array allocated to each processor within a range of the section corresponding to each processor is present in the second array allocated to each processor, mark the element having the matching value in the first array.

5. The shared-memory processor system as claimed in claim 4, wherein any one of said plurality of processors comprises means to prepare a third array having the same size as that of the first array in the memory; and the means to mark the element having the matching value in the first array comprises means to set a flag to the element in the third array corresponding to the element in the first array having the matching value.

6. A shared-memory multiprocessor system comprising:

(a) a memory storing a first table data and a second table data; and (b) a plurality of processors configured to access the memory, wherein the first table data and the second table data are stored in the memory as a record number array containing record numbers of the respective records according to a predetermined record order, a field value sequence number array containing field value sequence numbers corresponding to field values of a predetermined field in the records of the table data according to the record number, and a field value array containing the field values of the table data according to the order of the field value sequence number corresponding to the field value, wherein any one of the plurality of processors comprises means to allocate elements in the field value array of the first table data and elements of the field value array of the second table data to the plurality of the processors in the predetermined order by dividing the field value array into a plurality of sections according to the number of the plurality of processors, defining corresponding sections in the field value array of the second table data according to a value of an element at a boundary of the divided section in the field value array of the first table data, and adjusting the boundary of the sections so that a difference in a total number of elements in the field value array of the first data and elements in the field value array of the second table data among the plurality of sections falls within a predetermined tolerance;

each of the plurality of processors comprises means to compare elements in the field value array of the first table data and elements in the field value array of the second table data allocated to each processor, and, if determined that an element having a value matching that of an element in the field value array of the first table data allocated to each processor within a range of the section corresponding to each processor is present in the field value table of the second table data allocated to each processor, mark the element having the matching value in the field value array in the first table data;

any one of the plurality of processors comprises means to allocate a plurality of portions to the plurality of processors by dividing the record number array of the first table data to the plurality of the portions, the number of the plurality of the portions being equal to the number of the plurality of processors; and each of the plurality of processors comprises means to read out the record number from the allocated portion in the record number array of the first table data, read out the field value sequence number corresponding to the read out record number from the field value sequence number array of the first table data, determine whether an element in the field value array of the first table data corresponding to the read out field value sequence number has been marked, and if the element has been marked, classify the read out record number as the matching record, or otherwise classify the read out record number as the non-matching record.

7. A program for use in a shared-memory processor system including a memory storing a first array and a second array storing values in a predetermined order, which is ascending or descending order, without duplication; and a plurality of processors configured to access the memory, the program causing any one of the plurality of processors to perform:

a function to allocate elements of the first array and elements of the second array to the plurality of the processors in the predetermined order by dividing the first array into a plurality of sections according to the number of the plurality of processors, defining corresponding sections in the second array according to a value of an element at a boundary of the divided section in the first array, and adjusting the boundary of the sections so that a difference in a total number of elements in the first array and elements in the second array among the plurality of sections falls within a predetermined tolerance;

wherein each of the plurality of processors is caused by the program to perform:

a function to compare elements in the first array and elements in the second array allocated to each processor, and, if determined that an element having a value matching that of an element in the first array allocated to each processor within a range of the section corresponding to each processor is present in the second array allocated to each processor, mark the element having the matching value in the first array.

8. The program claimed in claim 7, wherein any one of the plurality of processors is caused by the program to further perform a function to prepare a third array having the same size as that of the first array in the memory; and each of the plurality of the processors is caused by the program to further perform a function to set a flag to an element in the third array corresponding to the element having the matching value in the first array.

9. A computer-readable record medium having a program of claim 7 recorded therein.

10. A program for use in a shared-memory multiprocessor system including a memory for storing a first table data and a second table data and a plurality of processors configured to access to the memory, wherein the first table data and the second table data are stored in the memory as a record number array containing record numbers of the respective records according to a predetermined record order, a field value sequence number array containing field value sequence numbers corresponding to field values of a predetermined field in the records of the table data according to the record number, and a field value array containing the field values of the table data according to the order of the field value sequence number corresponding to the field value, the program causing any one of the plurality of processors to perform:

a function to allocate elements in the field value array of the first table data and elements of the field value array of the second table data to the plurality of the processors in the predetermined order by dividing the field value array into a plurality of sections according to the number of the plurality of processors, defining corresponding sections in the field value array of the second table data according to a value of an element at a boundary of the divided section in the field value array of the first table data, and adjusting the boundary of the sections so that a difference in a total number of elements in the field value array of the first data and elements in the field value array of the second table data among the plurality of sections falls within a predetermined tolerance;

wherein each of the plurality of processors is caused by the program to perform:

a function to compare elements in the field value array of the first table data and elements in the field value array of the second table data allocated to each processor, and, if determined that an element having a value matching that of an element in the field value array of the first table data allocated to each processor within a range of the section corresponding to each processor is present in the field value table of the second table data allocated to each processor, mark the element having the matching value in the field value array in the first table data;

wherein any one of the plurality of processors is caused by the program to further perform:

a function to allocate a plurality of portions to the plurality of processors by dividing the record number array of the first table data to the plurality of the portions, the number of the plurality of the portions being equal to the number of the plurality of processors; and wherein each of the plurality of processors is caused by the program to further perform:

a function to read out the record number from the allocated portion in the record number array of the first table data, read out the field value sequence number corresponding to the read out record number from the field value sequence number array of the first table data, determine whether an element in the field value array of the first table data corresponding to the read out field value sequence number has been marked, and if the element has been marked, classify the read out record number as the matching record, or otherwise classify the read out record number as the non-matching record.

11. A computer-readable record medium having a program of claim 10 recorded therein.

* * * * *